US012600735B2

(12) United States Patent
Hermeke et al.

(10) Patent No.: US 12,600,735 B2
(45) Date of Patent: Apr. 14, 2026

(54) METHOD FOR PRODUCING POLYSULPHANE-SILANES BY MEANS OF PHASE TRANSFER CATALYSIS

(71) Applicant: Evonik Operations GmbH, Essen (DE)

(72) Inventors: Julia Hermeke, Gerlingen (DE); Helmut Dröge, Bornheim (DE); Evgenij Lyagin, Hanau (DE); Horst Mertsch, Rheinfelden (DE); Elisabeth Bauer, Kleines Wiesental (DE); Gert Smans, Mortsel (BE)

(73) Assignee: Evonik Operations GmbH, Essen (DE)

( * ) Notice: Subject to any disclaimer, the term of this patent is extended or adjusted under 35 U.S.C. 154(b) by 860 days.

(21) Appl. No.: 17/787,278

(22) PCT Filed: Dec. 14, 2020

(86) PCT No.: PCT/EP2020/086042
§ 371 (c)(1),
(2) Date: Jun. 17, 2022

(87) PCT Pub. No.: WO2021/122484
PCT Pub. Date: Jun. 24, 2021

(65) Prior Publication Data
US 2023/0039979 A1 Feb. 9, 2023

(30) Foreign Application Priority Data
Dec. 18, 2019 (EP) .................................... 19217272

(51) Int. Cl.
*C07F 7/18* (2006.01)
(52) U.S. Cl.
CPC .................................. *C07F 7/1872* (2013.01)
(58) Field of Classification Search
CPC ....................................................... C07F 7/20
See application file for complete search history.

(56) References Cited

U.S. PATENT DOCUMENTS

| | | | | |
|---|---|---|---|---|
| 5,132,423 A | | 7/1992 | Brunelle et al. | |
| 5,405,985 A | * | 4/1995 | Parker ................... | C07F 7/1892 556/427 |
| 5,468,893 A | | 11/1995 | Parker et al. | |
| 5,521,261 A | * | 5/1996 | Hofer ................... | C08G 59/066 528/92 |
| 5,583,245 A | | 12/1996 | Parker et al. | |
| 5,663,396 A | | 9/1997 | Musleve et al. | |
| 6,103,820 A | * | 8/2000 | Blankenburg ........... | A61Q 5/06 524/808 |
| 6,107,397 A | * | 8/2000 | Blankenburg ........ | C08F 226/00 524/808 |
| 6,384,255 B1 | | 5/2002 | Backer et al. | |
| 6,384,256 B1 | | 5/2002 | Backer et al. | |
| 6,448,426 B1 | * | 9/2002 | Backer ...................... | B60C 1/00 556/427 |
| 6,534,668 B2 | | 3/2003 | Backer et al. | |
| 6,740,767 B1 | | 5/2004 | Buesing et al. | |
| 11,697,659 B2 | * | 7/2023 | Droege ................. | C07F 7/1892 556/427 |
| 2003/0004162 A1 | * | 1/2003 | Treadway ............ | A61K 31/427 514/233.5 |
| 2004/0092758 A1 | * | 5/2004 | Buesing ................ | C07F 7/1892 556/427 |
| 2008/0319125 A1 | * | 12/2008 | Boswell ................ | C07F 7/1804 556/427 |
| 2010/0029971 A1 | * | 2/2010 | Korth ..................... | C07F 7/1892 556/427 |
| 2023/0037594 A1 | * | 2/2023 | Droege ................. | C07F 7/1804 |
| 2023/0265113 A1 | * | 8/2023 | Hermeke .............. | C07F 7/1892 556/427 |

FOREIGN PATENT DOCUMENTS

| | | | | |
|---|---|---|---|---|
| CN | 103772427 A | * | 5/2014 | |
| CN | 103772427 B | | 3/2016 | |
| DE | 195 19 793 A1 | | 12/1996 | |
| EP | 0 093 363 A1 | | 11/1983 | |
| EP | 93363 A | * | 11/1983 | ............. C07B 45/06 |
| EP | 1 130 023 B1 | | 8/2004 | |

OTHER PUBLICATIONS

O. Jacobmeier et al., Dynamic Simulation of Steam Distillation in a Fatty Acid Esterification, 101 Lipid/Fett, 370-378 (1999) (Year: 1999).*
B. Furniss et al., Vogel's Textbook of Practical Organic Chemistry 140, 169-190 (1989) (Year: 1989).*
J. de la Zerda et al., Journal of the Chemical Society, Perkin Transactions 2, 823-826 (1986) (Year: 1986).*
C. Weschler, 10 Indoor Air, 269-288 (2000) (Year: 2000).*
V. Smil, Global population and the nitrogen cycle, 277 Scientific American, 76-81 (1997) (Year: 1997).*
International Search Report issued Jan. 22, 2021 in PCT/EP2020/086042 filed Dec. 14, 2020, citing documents AO-AQ & AX therein, 2 pages.
Anonymous, "Steam distillation", Encyclopedia Britannica, Feb. 1, 2001, pp. 1-9, Retrieved from the Internet: https://www.britannica.com/science/steam-distillation, XP055683556.

(Continued)

*Primary Examiner* — Alexander R Pagano

(74) *Attorney, Agent, or Firm* — Grüneberg Global IP, PLLC

(57) ABSTRACT

A method for producing polysulphane-silanes of formula (I): $(R^1)_{3-m}R^2_mSi$—$R^3$—$S_x$—$R^3$—$SiR^2_m(OR^1)_{3-m}$ by reacting at least one silane of formula (II): $(R^1)_{3-m}R^2_mSi$—$R^3$-Hal with $M(SH)_y$ and/or $M_zS$ and sulphur, in the presence of a phase transfer catalyst of formula (III), wherein at least one carrier-vapour distillation and/or ozone treatment is performed during or after the reaction.

19 Claims, No Drawings

(56)    References Cited

OTHER PUBLICATIONS

Y. Sasson et al., "Synthesis of quaternary ammonium salts", chapter 3 from Handbook of Phase Transfer Catalysis, 1997, pp. 111-134.
Office Action received for U.S. Appl. No. 18/043,708, mailed on Jan. 9, 2026, 24 pages.
U.S. Appl. No. 18/043,708, filed Mar. 1, 2023, Patent Publication No. 2023/0265113, Hermeke et al.

* cited by examiner

METHOD FOR PRODUCING POLYSULPHANE-SILANES BY MEANS OF PHASE TRANSFER CATALYSIS

CROSS-REFERENCE TO RELATED APPLICATIONS

The present application is a 35 U.S.C. § 371 national stage application of International patent application PCT/EP2020/086042, filed Dec. 14, 2020, which is based on and claims the benefit of priority to European Application No. 19217272.4, filed Dec. 18, 2019. The entire contents of these applications are incorporated herein by reference.

The invention provides a process for preparing polysulfane silanes by means of phase transfer catalysis.

U.S. Pat. Nos. 5,405,985, 5,583,245 and 5,663,396 disclose the preparation of compounds of the formula Z-Alk-$S_n$-Alk-Z by means of phase transfer catalysis.

U.S. Pat. No. 5,468,893 also discloses the preparation of polysulfane silanes by phase transfer catalysis in the presence of an alkali metal halide or alkali metal sulfate.

U.S. Pat. Nos. 6,384,255 and 6,448,426 disclose alteration of the sequence of addition in phase transfer catalysis.

In U.S. Pat. No. 6,384,256, $M_2S_n$ or MSH is reacted with sulfur in a preliminary reaction in the presence of MOH.

U.S. Pat. Nos. 6,740,767 and 6,534,668 also disclose the addition of buffer in phase transfer catalysis.

Handbook of Phase Transfer Catalysis (ISBN 978-0-7514-0258-2), chapter 3, pages 123-127, discloses the breakdown of quaternary ammonium phase transfer catalyst, for example tert-butylammonium bromide to tributylamine.

A disadvantage of the known PTC processes for preparing polysulfane silanes are that degradation products of the catalyst are sometimes toxic or harmful to health in the end product.

The invention provides a process for preparing polysulfane silanes of the formula I $$(R^1)_{3-m}R^2_mSi\text{—}R^3\text{—}S_x\text{—}R^3\text{—}SiR^2_m(R^1)_{3-m} \qquad \text{I}$$

where $R^1$ are the same or different and are a C1-C10 alkoxy group, phenoxy group or alkyl polyether group —$(R'\text{—}O)_rR''$ where R' is the same or different and is a branched or unbranched, saturated or unsaturated, aliphatic, aromatic or mixed aliphatic/aromatic divalent C1-C30 hydrocarbon group, r is an integer from 1 to 30 and R'' is unsubstituted or substituted, branched or unbranched, monovalent alkyl, alkenyl, aryl or aralkyl group, $R^2$ are the same or different and are a C6-C20 aryl group, C1-C10 alkyl group, C2-C20 alkenyl group, C7-C20 aralkyl group or halogen, $R^3$ are the same or different and are a branched or unbranched, saturated or unsaturated, aliphatic, aromatic or mixed aliphatic/aromatic divalent C1-C30 hydrocarbon group, and m is the same or different and is 0, 1, 2 or 3, x is 2-10, preferably 2-4, by reacting at least one silane of the formula II $$(R^1)_{3-m}R^2_mSi\text{—}R^3\text{-Hal} \qquad \text{II}$$

where Hal is Cl, Br or I, preferably Cl, with $M(SH)_y$, preferably NaSH, and/or $M_zS$, preferably $Na_2S$, and/or $M_gS_n$ and/or sulfur, where y=1 or 2, and M=Na or K when y=1, and M=Ca or Mg when y=2, and z=1 or 2, and M=Ca or Mg when z=1, and M=Na or K when z=2, and g=1 or 2, and M=Ca or Mg when g=1, and M=Na or K when g=2, h=natural number from 1 to 10, in the presence of a base, an aqueous phase and a phase transfer catalyst of the formula III $$\begin{array}{c} R^5 \\ \overset{\oplus}{\underset{R^4}{Y}}\!\!\!\diagup\!\!R^6 \quad X^\ominus \\ R^4 \diagdown R^7 \end{array} \qquad \text{III}$$

where Y is an element of main group 5, preferably N, P or As, more preferably N or P, most preferably N, $R^4$, $R^5$, $R^6$ and $R^7$ are identical or different and are —$(CH_2)_kCH_3$ alkyl radicals, with k=0-9, or there are one or two ring closures —$(CH_2)_n$— with n=2-5, preferably n=4, between two substituents selected from the $R^4$, $R^5$, $R^6$ and $R^7$ groups, and $X^-$ is $F^-$, $I^-$, $Cl^-$, $Br^-$, $ClO_4^-$, $PF_6^-$, $BF_4^-$, $(C_6H_6)_4B^-$, $H_2PO_4^-$, $CH_3SO_3^-$, $C_6H_6SO_3^-$, $HSO_4^-$, $NO_3^-$ or $\frac{1}{2}SO_4^{2-}$ which is characterized in that at least one carrier vapour distillation and/or ozone treatment is performed during or after the reaction.

It may preferably be the case that $R^1$ is ethoxy, m=0 and $R^3$=$(CH_2)_3$,

It may preferably be the case that Hal=Cl,

The polysulfane silane of the formula I may preferably be:
$[(CH_3O)_3Si(CH_2)_3]_2S$, $[(CH_3O)_3Si(CH_2)_3]_2S_2$, $[(CH_3O)_3Si(CH_2)_3]_2S_3$, $[(CH_3O)_3Si(CH_2)_3]_2S_4$, $[(CH_3O)_3Si(CH_2)_3]_2S_5$, $[(CH_3O)_3Si(CH_2)_3]_2S_6$, $[(CH_3O)_3Si(CH_2)_3]_2S_7$, $[(CH_3O)_3Si(CH_2)_3]_2S_8$, $[(CH_3O)_3Si(CH_2)_3]_2S_9$, $[(CH_3O)_3Si(CH_2)_3]_2S_{10}$, $[(CH_3O)_3Si(CH_2)_3]_2S_{11}$, $[(CH_3O)_3Si(CH_2)_3]_2S_{12}$, $[(CH_3CH_2O)_3Si(CH_2)_3]_2S$, $[(CH_3CH_2O)_3Si(CH_2)_3]_2S_2$, $[(CH_3CH_2O)_3Si(CH_2)_3]_2S_3$, $[(CH_3CH_2O)_3Si(CH_2)_3]_2S_4$, $[(CH_3CH_2O)_3Si(CH_2)_3]_2S_6$, $[(CH_3CH_2O)_3Si(CH_2)_3]_2S_6$, $[(CH_3CH_2O)_3Si(CH_2)_3]_2S_7$, $[(CH_3CH_2O)_3Si(CH_2)_3]_2S_8$, $[(CH_3CH_2O)_3Si(CH_2)_3]_2S_9$, $[(CH_3CH_2O)_3Si(CH_2)_3]_2S_{10}$, $[(CH_3CH_2O)_3Si(CH_2)_3]_2S_{11}$, $[(CH_3CH_2O)_3Si(CH_2)_3]_2S_{12}$, $[(C_3H_7O)_3Si(CH_2)_3]_2S$, $[(C_3H_7O)_3Si(CH_2)_3]_2S_2$, $[(C_3H_7O)_3Si(CH_2)_3]_2S_3$, $[(C_3H_7O)_3Si(CH_2)_3]_2S_4$, $[(C_3H_7O)_3Si(CH_2)_3]_2S_5$, $[(C_3H_7O)_3Si(CH_2)_3]_2S_6$, $[(C_3H_7O)_3Si(CH_2)_3]_2S_7$, $[(C_3H_7O)_3Si(CH_2)_3]_2S_8$, $[(C_3H_7O)_3Si(CH_2)_3]_2S_9$, $[(C_3H_7O)_3Si(CH_2)_3]_2S_{10}$, $[(C_3H_7O)_3Si(CH_2)_3]_2S_{11}$, $[(C_3H_7O)_3Si(CH_2)_3]_2S_{12}$.

The silane of the formula II used may preferably be 3-chlorobutyl(triethoxysilane), 3-chlorobutyl(trimethoxysilane), 3-chlorobutyl(diethoxymethoxysilane), 3-chloropropyl(triethoxysilane), 3-chloropropyl (trimethoxysilane), 3-chloropropyl(diethoxymethoxysilane), 2-chloroethyl(triethoxysilane), 2-chloroethyl (trimethoxysilane), 2-chloroethyl (diethoxymethoxysilane), 1-chloromethyl (triethoxysilane), 1-chloromethyl(trimethoxysilane), 1-chloromethyl(diethoxymethoxysilane), 3-chloropropyl(diethoxymethylsilane), 3-chloropropyl(dimethoxymethylsilane), 2-chloroethyl(diethoxymethylsilane), 2-chloroethyl(dimethoxymethylsilane), 1-chloromethyl(diethoxymethylsilane), 1-chloromethyl(dimethoxymethylsilane), 1-chloroethyl(dimethoxymethylsilane), 3-chloropropyl(ethoxydimethylsilane), 3-chloropropyl(methoxydimethylsilane), 2-chloroethyl(ethoxydimethylsilane), 2-chloroethyl(methoxydimethylsilane), 1-chlorom-ethyl(ethoxydimethylsilane), 1-chloromethyl(methoxydimethylsilane), $[(C_9H_{19}O—(CH_2—CH_2O)_2](CH_3O)_2Si(CH_2)_3Cl$, $[(C_9H_{19}O—(CH_2—CH_2O)_3](CH_3O)_2Si(CH_2)_3Cl$, $[(C_9H_{19}O—(CH_2—CH_2O)_4](CH_3O)_2Si(CH_2)_3Cl$, $[(C_9H_{19}O—(CH_2—CH_2O)_5](CH_3O)_2Si(CH_2)_3Cl$, $[(C_9H_{19}O—(CH_2—CH_2O)_6](CH_3O)_2Si(CH_2)_3Cl$, $[(C_{12}H_{25}O—(CH_2—CH_2O)_4](CH_3O)_2Si(CH_2)_3Cl$, $[(C_{12}H_{25}O—(CH_2—CH_2O)_3](CH_3O)_2Si(CH_2)_3Cl$, $[(C_{12}H_{25}O—(CH_2—CH_2O)_4](CH_3O)_2Si(CH_2)_3Cl$, $[(C_{12}H_{25}O—(CH_2—CH_2O)_5](CH_3O)_2Si(CH_2)_3Cl$, $[(C_{12}H_{25}O—(CH_2—CH_2O)_6](CH_3O)_2Si(CH_2)_3Cl$, $[(C_{13}H_{27}O—(CH_2—CH_2O)_4](CH_3O)_2Si(CH_2)_3Cl$, $[(C_{13}H_{27}O—(CH_2—CH_2O)_3](CH_3O)_2Si(CH_2)_3Cl$, $[(C_{13}H_{27}O—(CH_2—CH_2O)_4](CH_3O)_2Si(CH_2)_3Cl$, $[(C_{13}H_{27}O—(CH_2—CH_2O)_5](CH_3O)_2Si(CH_2)_3Cl$, $[(C_{13}H_{27}O—(CH_2—CH_2O)_6](CH_3O)_2Si(CH_2)_3Cl$, $[(C_{14}H_{29}O—(CH_2—CH_2O)_4](CH_3O)_2Si(CH_2)_3Cl$, $[(C_{14}H_{29}O—(CH_2—CH_2O)_3](CH_3O)_2Si(CH_2)_3Cl$, $[(C_{14}H_{29}O—(CH_2—CH_2O)_4](CH_3O)_2Si(CH_2)_3Cl$, $[(C_{14}H_{29}O—(CH_2—CH_2O)_5](CH_3O)_2Si(CH_2)_3Cl$, $[(C_{14}H_{29}O—(CH_2—CH_2O)_6](CH_3O)_2Si(CH_2)_3Cl$, $[(C_9H_{19}O—(CH_2—CH_2O)_4]_2(CH_3O)_2Si(CH_2)_3Cl$, $[(C_9H_{19}O—(CH_2—CH_2O)_6](CH_3O)_2Si(CH_2)_3Cl$, $[(C_9H_{19}O—(CH_2—CH_2O)_4]_2(CH_3O)_2Si(CH_2)_3Cl$, $[(C_9H_{19}O—(CH_2—CH_2O)_5]_2(CH_3O)_2Si(CH_2)_3Cl$, $[(C_9H_{19}O—(CH_2—CH_2O)_6]_2(CH_3O)_2Si(CH_2)_3Cl$, $[(C_{12}H_{25}O—(CH_2—CH_2O)_4]_2(CH_3O)_2Si(CH_2)_3Cl$, $[(C_{12}H_{25}O—(CH_2—CH_2O)_3]_2(CH_3O)_2Si(CH_2)_3Cl$, $[(C_{12}H_{25}O—(CH_2—CH_2O)_4]_2(CH_3O)_2Si(CH_2)_3Cl$, $[(C_{12}H_{25}O—(CH_2—CH_2O)_5]_2(CH_3O)_2Si(CH_2)_3Cl$, $[(C_{12}H_{25}O—(CH_2—CH_2O)_6]_2(CH_3O)_2Si(CH_2)_3Cl$, $[(C_{13}H_{27}O—(CH_2—CH_2O)_4]_2(CH_3O)_2Si(CH_2)_3Cl$, $[(C_{13}H_{27}O—(CH_2—CH_2O)_3]_2(CH_3O)_2Si(CH_2)_3Cl$, $[(C_{13}H_{27}O—(CH_2—CH_2O)_4]_2(CH_3O)_2Si(CH_2)_3Cl$, $[(C_{13}H_{27}O—(CH_2—CH_2O)_5]_2(CH_3O)_2Si(CH_2)_3Cl$, $[(C_{13}H_{27}O—(CH_2—CH_2O)_6]_2(CH_3O)_2Si(CH_2)_3Cl$, $[(C_{14}H_{29}O—(CH_2—CH_2O)_4]_2(CH_3O)_2Si(CH_2)_3Cl$, $[(C_{14}H_{29}O—(CH_2—CH_2O)_5]_2(CH_3O)_2Si(CH_2)_3Cl$, $[(C_{14}H_{29}O—(CH_2—CH_2O)_4]_2(CH_3O)_2Si(CH_2)_3Cl$, $[(C_{14}H_{29}O—(CH_2—CH_2O)_5]_2(CH_3O)_2Si(CH_2)_3Cl$, $[(C_{14}H_{29}O—(CH_2—CH_2O)_6]_2(CH_3O)_2Si(CH_2)_3Cl$, $[(C_9H_{19}O—(CH_2—CH_2O)_2](CH_3CH_2O)_2Si(CH_2)_3Cl$, $[(C_9H_{19}O—(CH_2—CH_2O)_3](CH_3CH_2O)_2Si(CH_2)_3Cl$, $[(C_9H_{19}O—(CH_2—CH_2O)_4](CH_3CH_2O)_2Si(CH_2)_3Cl$, $[(C_9H_{19}O—(CH_2—CH_2O)_5](CH_3CH_2O)_2Si(CH_2)_3Cl$, $[(C_9H_{19}O—(CH_2—CH_2O)_6](CH_3CH_2O)_2Si(CH_2)_3Cl$, $[(C_{12}H_{25}O—(CH_2—CH_2O)_2](CH_3CH_2O)_2Si(CH_2)_3Cl$, $[(C_{12}H_{25}O—(CH_2—CH_2O)_3](CH_3CH_2O)_2Si(CH_2)_3Cl$, $[(C_{12}H_{25}O—(CH_2—CH_2O)_4](CH_3CH_2O)_2Si(CH_2)_3Cl$, $[(C_{12}H_{25}O—(CH_2—CH_2O)_5](CH_3CH_2O)_2Si(CH_2)_3Cl$, $[(C_{12}H_{25}O—(CH_2—CH_2O)_6](CH_3CH_2O)_2Si(CH_2)_3Cl$, $[(C_{13}H_{27}O—(CH_2—CH_2O)_2](CH_3CH_2O)_2Si(CH_2)_3Cl$, $[(C_{13}H_{27}O—(CH_2—CH_2O)_3](CH_3CH_2O)_2Si(CH_2)_3Cl$, $[(C_{13}H_{27}O—(CH_2—CH_2O)_4](CH_3CH_2O)_2Si(CH_2)_3Cl$, $[C_{13}H_{27}O—(CH_2—CH_2O)_5](CH_3CH_2O)_2Si(CH_2)_3Cl$, $[(C_{13}H_{27}O—(CH_2—CH_2O)_6](CH_3CH_2O)_2Si(CH_2)_3Cl$, $[C_{14}H_{29}O—(CH_2—CH_2O)_2](CH_3CH_2O)_2Si(CH_2)_3Cl$, $[(C_{14}H_{29}O—(CH_2—CH_2O)_3](CH_3CH_2O)_2Si(CH_2)_3Cl$, $[(C_{14}H_{29}O—(CH_2—CH_2O)_4](CH_3CH_2O)_2Si(CH_2)_3Cl$, $[(C_{14}H_{29}O—(CH_2—CH_2O)_5](CH_3CH_2O)_2Si(CH_2)_3Cl$, $[(C_{14}H_{29}O—(CH_2—CH_2O)_6](CH_3CH_2O)_2Si(CH_2)_3Cl$, $[(C_9H_{19}O—(CH_2—CH_2O)_4]_2(CH_3CH_2O)Si(CH_2)_3Cl$, $[(C_9H_{19}O—(CH_2—CH_2O)_3]_2(CH_3CH_2O)Si(CH_2)_3Cl$, $[(C_9H_{19}O—(CH_2—CH_2O)_4]_2(CH_3CH_2O)Si(CH_2)_3Cl$, $[(C_9H_{19}O—(CH_2—CH_2O)_5]_2(CH_3CH_2O)Si(CH_2)_3Cl$, $[(C_9H_{19}O—(CH_2—CH_2O)_6]_2(CH_3CH_2O)Si(CH_2)_3Cl$, $[(C_{12}H_{25}O—(CH_2—CH_2O)_4]_2(CH_3CH_2O)Si(CH_2)_3Cl$, $[(C_{12}H_{25}O—(CH_2—CH_2O)_3]_2(CH_3CH_2O)Si(CH_2)_3Cl$, $[(C_{12}H_{25}O—(CH_2—CH_2O)_4]_2(CH_3CH_2O)Si(CH_2)_3Cl$, $[(C_{12}H_{25}O—(CH_2—CH_2O)_5]_2(CH_3CH_2O)Si(CH_2)_3Cl$, $[(C_{12}H_{25}O—(CH_2—CH_2O)_6]_2(CH_3CH_2O)Si(CH_2)_3Cl$, $[(C_{13}H_{27}O—(CH_2—CH_2O)_4]_2(CH_3CH_2O)Si(CH_2)_3Cl$, $[(C_{13}H_{27}O—(CH_2—CH_2O)_3]_2(CH_3CH_2O)Si(CH_2)_3Cl$, $[(C_{13}H_{27}O—(CH_2—CH_2O)_4]_2(CH_3CH_2O)Si(CH_2)_3Cl$, $[(C_{13}H_{27}O—(CH_2—CH_2O)_5]_2(CH_3CH_2O)Si(CH_2)_3Cl$, $[(C_{13}H_{27}O—(CH_2—CH_2O)_6]_2(CH_3CH_2O)Si(CH_2)_3Cl$, $[(C_{14}H_{29}O—(CH_2—CH_2O)_4]_2(CH_3CH_2O)Si(CH_2)_3Cl$, $[(C_{14}H_{29}O—(CH_2—CH_2O)_5]_2(CH_3CH_2O)Si(CH_2)_3Cl$, $[(C_{14}H_{29}O—(CH_2—CH_2O)_4]_2(CH_3CH_2O)Si(CH_2)_3Cl$, $[(C_{14}H_{29}O—(CH_2—CH_2O)_5]_2(CH_3CH_2O)Si(CH_2)_3Cl$, $[(C_{14}H_{29}O—(CH_2—CH_2O)_6]_2(CH_3CH_2O)Si(CH_2)_3Cl$, $[(C_9H_{19}O—(CH_2—CH_2O)_4]_3Si(CH_2)_3Cl$, $[(C_9H_{19}O—(CH_2—CH_2O)_3]_3Si(CH_2)_3Cl$, $[(C_9H_{19}O—(CH_2—CH_2O)_4]_3Si(CH_2)_3Cl$, $[(C_9H_{19}O—(CH_2—CH_2O)_5]_3Si(CH_2)_3Cl$, $[(C_9H_{19}O—(CH_2—CH_2O)_6]_3Si(CH_2)_3Cl$, $[(C_{12}H_{25}O—(CH_2—CH_2O)_4]_3Si(CH_2)_3Cl$, $[(C_{12}H_{25}O—(CH_2—CH_2O)_3]_3Si(CH_2)_3Cl$, $[(C_{12}H_{25}O—(CH_2—CH_2O)_4]_3Si(CH_2)_3Cl$, $[(C_{12}H_{25}O—(CH_2—CH_2O)_5]_3Si(CH_2)_3Cl$, $[(C_{12}H_{25}O—(CH_2—CH_2O)_6]_3Si(CH_2)_3Cl$, $[(C_{13}H_{27}O—(CH_2—CH_2O)_4]_3Si(CH_2)_3Cl$, $[(C_{13}H_{27}O—(CH_2—CH_2O)_3]_3Si(CH_2)_3Cl$, $[(C_{13}H_{27}O—(CH_2—CH_2O)_4]_3Si(CH_2)_3Cl$, $[(C_{13}H_{27}O—(CH_2—CH_2O)_5]_3Si(CH_2)_3Cl$, $[(C_{13}H_{27}O—(CH_2—CH_2O)_6]_3Si(CH_2)_3Cl$, $[(C_{14}H_{29}O—(CH_2—CH_2O)_4]_3Si(CH_2)_3Cl$, $[(C_{14}H_{29}O—(CH_2—CH_2O)_3]_3Si(CH_2)_3Cl$, $[(C_{14}H_{29}O—(CH_2—CH_2O)_4]_3Si(CH_2)_3Cl$, $[(C_{14}H_{29}O—(CH_2—CH_2O)_5]_3Si(CH_2)_3Cl$ or $[(C_{14}H_{29}O—(CH_2—CH_2O)_6]_3Si(CH_2)_3Cl$.

Phase transfer catalyst of the formula III may be:

$[N(CH_3)_4]X$, $[N(C_2H_5)_4]X$, $[N(C_3H_7)_4]X$, $[N(C_4H_9)_4]X$, $[N(C_5H_{11})_4]X$, $[N(C_6H_{13})_4]X$, $[N(C_7H_{15})_4]X$, $[N(C_6H_{17})_4]X$, $[N(C_9H_{19})_4]X$, $[N(C_{10}H_{21})_4]X$, $[N(C_2H_5)(CH_3)_3]X$, $[N(C_2H_5)_2(CH_3)_2]X$, $[N(C_2H_5)_3(CH_3)]X$, $[N(C_3H_7)(CH_3)_3]X$, $[N(C_3H_7)_2(CH_3)_2]X$, $[N(C_3H_7)_3(CH_3)]X$, $[N(C_4H_9)(CH_3)_3]X$, $[N(C_4H_9)_2(CH_3)_2]X$, $[N(C_4H_9)_3(CH_3)]X$, $[N(C_5H_{11})(CH_3)_3]X$, $[N(C_5H_{11})_2(CH_3)_2]X$, $[N(C_5H_{11})_3(CH_3)]X$, $[N(C_6H_{13})(CH_3)_3]X$, $[N(C_6H_{13})_2(CH_3)_2]X$, $[N(C_6H_{13})_3(CH_3)]X$, $[N(C_7H_{15})(CH_3)_3]X$, $[N(C_7H_{15})_2(CH_3)_2]X$, $[N(C_7H_{15})_3(CH_3)]X$, $[N(C_8H_{17})(CH_3)_3]X$, $[N(C_8H_{17})_2(CH_3)_2]X$, $[N(C_8H_{17})_3(CH_3)]X$, $[N(C_9H_{19})(CH_3)_3]X$, $[N(C_9H_{19})_2(CH_3)_2]X$, $[N(C_9H_{19})_3(CH_3)]X$, $[N(C_{10}H_{21})(CH_3)_3]X$, $[N(C_{10}H_{21})_2(CH_3)_2]X$, $[N(C_{10}H_{21})_3(CH_3)]X$, $[N(C_3H_7)(C_2H_5)_3]X$, $[N(C_3H_7)_2(C_2H_5)_2]X$, $[N(C_3H_7)_3(C_2H_5)]X$, $[N(C_4H_9)(C_2H_5)_3]X$, $[N(C_4H_9)_2(C_2H_5)_2]X$, $[N(C_4H_9)_3(C_2H_5)]X$, $[N(C_5H_{11})(C_2H_5)_3]X$, $[N(C_5H_{11})_2(C_2H_5)_2]X$, $[N(C_5H_{11})_3(C_2H_5)]X$, $[N(C_6H_{13})(C_2H_5)_3]X$, $[N(C_6H_{13})_2(C_2H_5)_2]X$, $[N(C_6H_{13})_3(C_2H_5)]X$, $[N(C_7H_{15})(C_2H_5)_3]X$, $[N(C_7H_{15})_2(C_2H_5)_2]X$, $[N(C_7H_{15})_3(C_2H_5)]X$, $[N(C_8H_{17})(C_2H_5)_3]X$, $[N(C_8H_{17})_2(C_2H_5)_2]X$, $[N(C_8H_{17})_3(C_2H_5)]X$, $[N(C_9H_{19})(C_2H_5)_3]X$, $[N(C_9H_{19})_2(C_2H_5)_2]X$, $[N(C_9H_{19})_3(C_2H_5)]X$, $[N(C_{10}H_{21})(C_2H_5)_3]X$, $[N(C_{10}H_{21})_2(C_2H_5)_2]X$, $[N(C_{10}H_{21})_3(C_2H_5)]X$, $[N(C_4H_9)(C_3H_7)_3]X$, $[N(C_4H_9)_2(C_3H_7)_2]X$, $[N(C_4H_9)_3(C_3H_7)]X$, $[N(C_5H_{11})(C_3H_7)_3]X$, $[N(C_5H_{11})_2(C_3H_7)_2]X$, $[N(C_5H_{11})_3(C_3H_7)]X$, $[N(C_6H_{13})(C_3H_7)_3]X$, $[N(C_6H_{13})_2(C_3H_7)_2]X$, $[N(C_6H_{13})_3(C_3H_7)]X$, $[N(C_7H_{15})(C_3H_7)_3]X$, $[N(C_7H_{15})_2(C_3H_7)_2]X$, $[N(C_7H_{15})_3(C_3H_7)]X$, $[N(C_8H_{17})(C_3H_7)_3]X$, $[N(C_8H_{17})_2(C_3H_7)_2]X$, $[N(C_8H_{17})_3(C_3H_7)]X$, $[N(C_9H_{19})(C_3H_7)_3]X$, $[N(C_9H_{19})_2(C_3H_7)_2]X$, $[N(C_9H_{19})_3(C_3H_7)]X$, $[N(C_{10}H_{21})(C_3H_7)_3]X$, $[N(C_{10}H_{21})_2(C_3H_7)_2]X$, $[N(C_{10}H_{21})_3(C_3H_7)]X$, $[N(C_5H_{11})(C_4H_9)_3]X$, $[N(C_5H_{11})_2(C_4H_9)_2]X$, $[N(C_5H_{11})_3(C_4H_9)]X$, $[N(C_6H_{13})(C_4H_9)_3]X$, $[N(C_6H_{13})_2(C_4H_9)_2]X$, $[N(C_6H_{13})_3(C_4H_9)]X$, $[N(C_7H_{15})(C_4H_9)_3]X$, $[N(C_7H_{15})_2(C_4H_9)_2]X$, $[N(C_7H_{15})_3(C_4H_9)]X$, $[N(C_8H_{17})(C_4H_9)_3]X$, $[N(C_8H_{17})_2(C_4H_9)_2]X$, $[N(C_8H_{17})_3(C_4H_9)]X$, $[N(C_9H_{19})(C_4H_9)_3]X$, $[N(C_9H_{19})_2(C_4H_9)_2]X$, $[N(C_9H_{19})_3(C_4H_9)]X$, $[N(C_{10}H_{21})(C_4H_9)_3]X$, $[N(C_{10}H_{21})_2(C_4H_9)_2]X$, $[N(C_{10}H_{21})_3(C_4H_9)]X$, $[N(C_6H_{13})(C_5H_{11})_3]X$, $[N(C_6H_{13})_2(C_5H_{11})_2]X$, $[N(C_6H_{13})_3(C_5H_{11})]X$, $[N(C_7H_{15})(C_5H_{11})_3]X$, $[N(C_7H_{15})_2(C_5H_{11})_2]X$, $[N(C_7H_{15})_3(C_5H_{11})]X$, $[N(C_8H_{17})(C_5H_{11})_3]X$, $[N(C_8H_{17})_2(C_5H_{11})_2]X$, $[N(C_8H_{17})_3(C_5H_{11})]X$, $[N(C_9H_{19})(C_5H_{11})_3]X$, $[N(C_9H_{19})_2(C_5H_{11})_2]X$, $[N(C_9H_{19})_3(C_5H_{11})]X$, $[N(C_{10}H_{21})(C_5H_{11})_3]X$, $[N(C_{10}H_{21})_2(C_5H_{11})_2]X$, $[N(C_{10}H_{21})_3(C_5H_{11})]X$, $[N(C_7H_{15})(C_6H_{13})_3]X$, $[N(C_7H_{15})_2(C_6H_{13})_2]X$, $[N(C_7H_{15})_3(C_6H_{13})]X$, $[N(C_8H_{17})(C_6H_{13})_3]X$, $[N(C_8H_{17})_2(C_6H_{13})_2]X$, $[N(C_8H_{17})_3(C_6H_{13})]X$, $[N(C_9H_{19})(C_6H_{13})_3]X$, $[N(C_9H_{19})_2(C_6H_{13})_2]X$, $[N(C_9H_{19})_3(C_6H_{13})]X$, $[N(C_{10}H_{21})(C_6H_{13})_3]X$, $[N(C_{10}H_{21})_2(C_6H_{13})_2]X$, $[N(C_{10}H_{21})_3(C_6H_{13})]X$, $[N(C_8H_{17})(C_7H_{15})_3]X$, $[N(C_8H_{17})_2(C_7H_{15})_2]X$, $[N(C_8H_{17})_3(C_7H_{15})]X$, $[N(C_9H_{19})(C_7H_{15})_3]X$, $[N(C_9H_{19})_2(C_7H_{15})_2]X$, $[N(C_9H_{19})_3(C_7H_{15})]X$, $[N(C_{10}H_{21})(C_7H_{15})_3]X$, $[N(C_{10}H_{21})_2(C_7H_{15})_2]X$, $[N(C_{10}H_{21})_3(C_7H_{15})]X$, $[N(C_9H_{19})(C_8H_{17})_3]X$, $[N(C_9H_{19})_2(C_8H_{17})_2]X$, $[N(C_9H_{19})_3(C_8H_{17})]X$, $[N(C_{10}H_{21})(C_8H_{17})_3]X$, $[N(C_{10}H_{21})_2(C_8H_{17})_2]X$, $[N(C_{10}H_{21})_3(C_8H_{17})]X$, $[N(C_{10}H_{21})(C_9H_{19})_3]X$, $[N(C_{10}H_{21})_2(C_9H_{19})_2]X$, $[N(C_{10}H_{21})_3(C_9H_{19})]X$, $[N(CH_3)(C_{10}H_{21})(C_2H_5)_2]X$, $[N(CH_3)(C_{10}H_{21})_2(C_2H_5)]X$, $[N(CH_3)(C_{10}H_{21})(C_3H_7)_2]X$, $[N(CH_3)(C_{10}H_{21})_2(C_3H_7)]X$, $[N(CH_3)(C_{10}H_{21})(C_4H_9)_2]X$, $[N(CH_3)(C_{10}H_{21})_2(C_4H_9)]X$, $[N(CH_3)(C_{10}H_{21})(C_5H_{11})_2]X$, $[N(CH_3)(C_{10}H_{21})_2(C_5H_{11})]X$, $[N(CH_3)(C_{10}H_{21})(C_6H_{13})_2]X$, $[N(CH_3)(C_{10}H_{21})_2(C_6H_{13})]X$, $[N(CH_3)(C_{10}H_{21})(C_7H_{15})_2]X$, $[N(CH_3)(C_{10}H_{21})_2(C_7H_{15})]X$, $[N(CH_3)(C_{10}H_{21})(C_8H_{17})_2]X$, $[N(CH_3)(C_{10}H_{21})_2(C_8H_{17})]X$, $[N(CH_3)(C_{10}H_{21})(C_9H_{19})_2]X$, $[N(CH_3)(C_{10}H_{21})_2(C_9H_{19})]X$, $[N(CH_3)(C_9H_{19})(C_2H_5)_2]X$, $[N(CH_3)(C_9H_{19})_2(C_2H_5)]X$, $[N(CH_3)(C_9H_{19})(C_3H_7)_2]X$, $[N(CH_3)(C_9H_{19})_2(C_3H_7)]X$, $[N(CH_3)(C_9H_{19})(C_4H_9)_2]X$, $[N(CH_3)(C_9H_{19})_2(C_4H_9)]X$, $[N(CH_3)(C_9H_{19})(C_5H_{11})_2]X$, $[N(CH_3)(C_9H_{19})_2(C_5H_{11})]X$, $[N(CH_3)(C_9H_{19})(C_6H_{13})_2]X$, $[N(CH_3)(C_9H_{19})_2(C_6H_{13})]X$, $[N(CH_3)(C_9H_{19})(C_7H_{15})_2]X$, $[N(CH_3)(C_9H_{19})_2(C_7H_{15})]X$, $[N(CH_3)(C_9H_{19})(C_8H_{17})_2]X$, $[N(CH_3)(C_9H_{19})_2(C_8H_{17})]X$, $[N(CH_3)(C_8H_{17})(C_2H_5)_2]X$, $[N(CH_3)(C_8H_{17})_2(C_2H_5)]X$, $[N(CH_3)(C_8H_{17})(C_3H_7)_2]X$, $[N(CH_3)(C_8H_{17})_2(C_3H_7)]X$, $[N(CH_3)(C_8H_{17})(C_4H_9)_2]X$, $[N(CH_3)(C_8H_{17})_2(C_4H_9)]X$, $[N(CH_3)(C_8H_{17})(C_5H_{11})_2]X$, $[N(CH_3)(C_8H_{17})_2(C_5H_{11})]X$, $[N(CH_3)(C_8H_{17})(C_6H_{13})_2]X$, $[N(CH_3)(C_8H_{17})_2(C_6H_{13})]X$, $[N(CH_3)(C_8H_{17})(C_7H_{15})_2]X$, $[N(CH_3)(C_8H_{17})_2(C_7H_{15})]X$, $[N(CH_3)(C_7H_{15})(C_2H_5)_2]X$, $[N(CH_3)(C_7H_{15})_2(C_7H_{15})]X$, $[N(CH_3)(C_7H_{15})(C_3H_7)_2]X$, $[N(CH_3)(C_7H_{15})_2(C_3H_7)]X$, $[N(CH_3)(C_7H_{15})(C_4H_9)_2]X$, $[N(CH_3)(C_7H_{15})_2(C_4H_9)]X$, $[N(CH_3)(C_7H_{15})(C_5H_{11})_2]X$, $[N(CH_3)(C_7H_{15})_2(C_5H_{11})]X$, $[N(CH_3)(C_7H_{15})(C_6H_{13})_2]X$, $[N(CH_3)(C_7H_{15})_2(C_6H_{13})]X$, $[N(CH_3)(C_6H_{13})(C_2H_5)_2]X$, $[N(CH_3)(C_6H_{13})_2(C_7H_{15})]X$, $[N(CH_3)(C_6H_{13})(C_3H_7)_2]X$, $[N(CH_3)(C_6H_{13})_2(C_3H_7)]X$, $[N(CH_3)(C_6H_{13})(C_4H_9)_2]X$, $[N(CH_3)(C_6H_{13})_2(C_4H_9)]X$, $[N(CH_3)(C_6H_{13})(C_5H_{11})_2]X$, $[N(CH_3)(C_6H_{13})_2(C_5H_{11})]X$, $[N(CH_3)(C_5H_{11})(C_2H_5)_2]X$, $[N(CH_3)(C_5H_{11})_2(C_2H_5)]X$, $[N(CH_3)(C_5H_{11})(C_3H_7)_2]X$, $[N(CH_3)(C_5H_{11})_2(C_3H_7)]X$, $[N(CH_3)(C_5H_{11})(C_4H_9)_2]X$, $[N(CH_3)(C_5H_{11})_2(C_4H_9)]X$, $[N(CH_3)(C_4H_9)(C_2H_5)_2]X$, $[N(CH_3)(C_4H_9)_2(C_2H_5)]X$, $[N(CH_3)(C_4H_9)(C_3H_7)_2]X$, $[N(CH_3)(C_4H_9)_2(C_3H_7)]X$, $[N(CH_3)(C_3H_7)(C_2H_5)_2]X$, $[N(CH_3)(C_3H_7)_2(C_2H_5)]X$, $[N(C_2H_5)(C_{10}H_{21})(C_3H_7)_2]X$, $[N(C_2H_5)(C_{10}H_{21})_2(C_3H_7)]X$, $[N(C_2H_5)(C_{10}H_{21})(C_4H_9)_2]X$, $[N(C_2H_5)(C_{10}H_{21})_2(C_4H_9)]X$, $[N(C_2H_5)(C_{10}H_{21})(C_5H_{11})_2]X$, $[N(C_2H_5)(C_{10}H_{21})_2(C_5H_{11})]X$,

7

$[N(C_2H_5)(C_{10}H_{21})(C_6H_{13})_2]X$, $[N(C_2H_5)(C_{10}H_{21})_2(C_6H_{13})]X$, $[N(C_2H_5)(C_{10}H_{21})(C_7H_{15})_2]X$, $[N(C_2H_5)(C_{10}H_{21})_2(C_7H_{15})]X$, $[N(C_2H_5)(C_{10}H_{21})(C_8H_{17})_2]X$, $[N(C_2H_5)(C_{10}H_{21})_2(C_8H_{17})]X$, $[N(C_2H_5)(C_{10}H_{21})(C_9H_{19})_2]X$, $[N(C_2H_5)(C_{10}H_{21})_2(C_9H_{19})]X$, $[N(C_2H_5)(C_9H_{19})(C_3H_7)_2]X$, $[N(C_2H_5)(C_9H_{19})_2(C_3H_7)]X$, $[N(C_2H_5)(C_9H_{19})(C_4H_9)_2]X$, $[N(C_2H_5)(C_9H_{19})_2(C_4H_9)]X$, $[N(C_2H_5)(C_9H_{19})(C_5H_{11})_2]X$, $[N(C_2H_5)(C_9H_{19})_2(C_5H_{11})]X$, $[N(C_2H_5)(C_9H_{19})(C_6H_{13})_2]X$, $[N(C_2H_5)(C_9H_{19})_2(C_6H_{13})]X$, $[N(C_2H_5)(C_9H_{19})(C_7H_{15})_2]X$, $[N(C_2H_5)(C_9H_{19})_2(C_7H_{15})]X$, $[N(C_2H_5)(C_9H_{19})(C_8H_{17})_2]X$, $[N(C_2H_5)(C_9H_{19})_2(C_8H_{17})]X$, $[N(C_2H_5)(C_8H_{17})(C_3H_7)_2]X$, $[N(C_2H_5)(C_8H_{17})_2(C_3H_7)]X$, $[N(C_2H_5)(C_8H_{17})(C_4H_9)_2]X$, $[N(C_2H_5)(C_8H_{17})_2(C_4H_9)]X$, $[N(C_2H_5)(C_8H_{17})(C_5H_{11})_2]X$, $[N(C_2H_5)(C_8H_{17})_2(C_5H_{11})]X$, $[N(C_2H_5)(C_8H_{17})(C_6H_{13})_2]X$, $[N(C_2H_5)(C_8H_{17})_2(C_6H_{13})]X$, $[N(C_2H_5)(C_8H_{17})(C_7H_{15})_2]X$, $[N(C_2H_5)(C_8H_{17})_2(C_7H_{15})]X$, $[N(C_2H_5)(C_7H_{15})(C_3H_7)_2]X$, $[N(C_2H_5)(C_7H_{15})_2(C_3H_7)]X$, $[N(C_2H_5)(C_7H_{15})(C_4H_9)_2]X$, $[N(C_2H_5)(C_7H_{15})_2(C_4H_9)]X$, $[N(C_2H_5)(C_7H_{15})(C_5H_{11})_2]X$, $[N(C_2H_5)(C_7H_{15})_2(C_5H_{11})]X$, $[N(C_2H_5)(C_7H_{15})(C_6H_{13})_2]X$, $[N(C_2H_5)(C_7H_{15})_2(C_6H_{13})]X$, $[N(C_2H_5)(C_6H_{13})(C_3H_7)_2]X$, $[N(C_2H_5)(C_6H_{13})_2(C_3H_7)]X$, $[N(C_2H_5)(C_6H_{13})(C_4H_9)_2]X$, $[N(C_2H_5)(C_6H_{13})_2(C_4H_9)]X$, $[N(C_2H_5)(C_6H_{13})(C_5H_{11})_2]X$, $[N(C_2H_5)(C_6H_{13})_2(C_5H_{11})]X$, $[N(C_2H_5)(C_5H_{11})(C_3H_7)_2]X$, $[N(C_2H_5)(C_5H_{11})_2(C_3H_7)]X$, $[N(C_2H_5)(C_5H_{11})(C_4H_9)_2]X$, $[N(C_2H_5)(C_5H_{11})_2(C_4H_9)]X$, $[N(C_2H_5)(C_4H_9)(C_3H_7)_2]X$, $[N(C_2H_5)(C_4H_9)_2(C_3H_7)]X$, $[N(C_3H_7)(C_{10}H_{21})(C_4H_9)_2]X$, $[N(C_3H_7)(C_{10}H_{21})_2(C_4H_9)]X$, $[N(C_3H_7)(C_{10}H_{21})(C_5H_{11})_2]X$, $[N(C_3H_7)(C_{10}H_{21})_2(C_5H_{11})]X$, $[N(C_3H_7)(C_{10}H_{21})(C_6H_{13})_2]X$, $[N(C_3H_7)(C_{10}H_{21})_2(C_6H_{13})]X$, $[N(C_3H_7)(C_{10}H_{21})(C_7H_{15})_2]X$, $[N(C_3H_7)(C_{10}H_{21})_2(C_7H_{15})]X$, $[N(C_3H_7)(C_{10}H_{21})(C_8H_{17})_2]X$, $[N(C_3H_7)(C_{10}H_{21})_2(C_8H_{17})]X$, $[N(C_3H_7)(C_{10}H_{21})(C_9H_{19})_2]X$, $[N(C_3H_7)(C_{10}H_{21})_2(C_9H_{19})]X$, $[N(C_3H_7)(C_9H_{19})(C_4H_9)_2]X$, $[N(C_3H_7)(C_9H_{19})_2(C_4H_9)]X$, $[N(C_3H_7)(C_9H_{19})(C_5H_{11})_2]X$, $[N(C_3H_7)(C_9H_{19})_2(C_5H_{11})]X$, $[N(C_3H_7)(C_9H_{19})(C_6H_{13})_2]X$, $[N(C_3H_7)(C_9H_{19})_2(C_6H_{13})]X$,

8

$[N(C_3H_7)(C_9H_{19})(C_7H_{15})_2]X$, $[N(C_3H_7)(C_9H_{19})_2(C_7H_{15})]X$, $[N(C_3H_7)(C_9H_{19})(C_8H_{17})_2]X$, $[N(C_3H_7)(C_9H_{19})_2(C_8H_{17})]X$, $[N(C_3H_7)(C_8H_{17})(C_4H_9)_2]X$, $[N(C_3H_7)(C_8H_{17})_2(C_4H_9)]X$, $[N(C_3H_7)(C_8H_{17})(C_5H_{11})_2]X$, $[N(C_3H_7)(C_8H_{17})_2(C_5H_{11})]X$, $[N(C_3H_7)(C_8H_{17})(C_6H_{13})_2]X$, $[N(C_3H_7)(C_8H_{17})_2(C_6H_{13})]X$, $[N(C_3H_7)(C_8H_{17})(C_7H_{15})_2]X$, $[N(C_3H_7)(C_8H_{17})_2(C_7H_{15})]X$, $[N(C_3H_7)(C_7H_{15})(C_4H_9)_2]X$, $[N(C_3H_7)(C_7H_{15})_2(C_4H_9)]X$, $[N(C_3H_7)(C_7H_{15})(C_5H_{11})_2]X$, $[N(C_3H_7)(C_7H_{15})_2(C_5H_{11})]X$, $[N(C_3H_7)(C_7H_{15})(C_6H_{13})_2]X$, $[N(C_3H_7)(C_7H_{15})_2(C_6H_{13})]X$, $[N(C_3H_7)(C_6H_{13})(C_4H_9)_2]X$, $[N(C_3H_7)(C_6H_{13})_2(C_4H_9)]X$, $[N(C_3H_7)(C_6H_{13})(C_5H_{11})_2]X$, $[N(C_3H_7)(C_6H_{13})_2(C_5H_{11})]X$, $[N(C_3H_7)(C_5H_{11})(C_4H_9)_2]X$, $[N(C_3H_7)(C_5H_{11})_2(C_4H_9)]X$, $[N(C_4H_9)(C_{10}H_{21})(C_5H_{11})_2]X$, $[N(C_4H_9)(C_{10}H_{21})_2(C_5H_{11})]X$, $[N(C_4H_9)(C_{10}H_{21})(C_6H_{13})_2]X$, $[N(C_4H_9)(C_{10}H_{21})_2(C_6H_{13})]X$, $[N(C_4H_9)(C_{10}H_{21})(C_7H_{15})_2]X$, $[N(C_4H_9)(C_{10}H_{21})_2(C_7H_{15})]X$, $[N(C_4H_9)(C_{10}H_{21})(C_8H_{17})_2]X$, $[N(C_4H_9)(C_{10}H_{21})_2(C_8H_{17})]X$, $[N(C_4H_9)(C_{10}H_{21})(C_9H_{19})_2]X$, $[N(C_4H_9)(C_{10}H_{21})_2(C_9H_{19})]X$, $[N(C_4H_9)(C_9H_{19})(C_5H_{11})_2]X$, $[N(C_4H_9)(C_9H_{19})_2(C_5H_{11})]X$, $[N(C_4H_9)(C_9H_{19})(C_6H_{13})_2]X$, $[N(C_4H_9)(C_9H_{19})_2(C_6H_{13})]X$, $[N(C_4H_9)(C_9H_{19})(C_7H_{15})_2]X$, $[N(C_4H_9)(C_9H_{19})_2(C_7H_{15})]X$, $[N(C_4H_9)(C_9H_{19})(C_8H_{17})_2]X$, $[N(C_4H_9)(C_9H_{19})_2(C_8H_{17})]X$, $[N(C_4H_9)(C_8H_{17})(C_5H_{11})_2]X$, $[N(C_4H_9)(C_8H_{17})_2(C_5H_{11})]X$, $[N(C_4H_9)(C_8H_{17})(C_6H_{13})_2]X$, $[N(C_4H_9)(C_8H_{17})_2(C_6H_{13})]X$, $[N(C_4H_9)(C_8H_{17})(C_7H_{15})_2]X$, $[N(C_4H_9)(C_8H_{17})_2(C_7H_{15})]X$, $[N(C_4H_9)(C_7H_{15})(C_5H_{11})_2]X$, $[N(C_4H_9)(C_7H_{15})_2(C_5H_{11})]X$, $[N(C_4H_9)(C_7H_{15})(C_6H_{13})_2]X$, $[N(C_4H_9)(C_7H_{15})_2(C_6H_{13})]X$, $[N(C_4H_9)(C_6H_{13})(C_5H_{11})_2]X$, $[N(C_4H_9)(C_6H_{13})_2(C_5H_{11})]X$, $[N(C_5H_{11})(C_{10}H_{21})(C_6H_{13})_2]X$, $[N(C_5H_{11})(C_{10}H_{21})_2(C_6H_{13})]X$, $[N(C_5H_{11})(C_{10}H_{21})(C_7H_{15})_2]X$, $[N(C_5H_{11})(C_{10}H_{21})_2(C_7H_{15})]X$, $[N(C_5H_{11})(C_{10}H_{21})(C_8H_{17})_2]X$, $[N(C_5H_{11})(C_{10}H_{21})_2(C_8H_{17})]X$, $[N(C_5H_{11})(C_{10}H_{21})(C_9H_{19})_2]X$, $[N(C_5H_{11})(C_{10}H_{21})_2(C_9H_{19})]X$, $[N(C_5H_{11})(C_9H_{19})(C_6H_{13})_2]X$, $[N(C_5H_{11})(C_9H_{19})_2(C_6H_{13})]X$, $[N(C_5H_{11})(C_9H_{19})(C_7H_{15})_2]X$, $[N(C_5H_{11})(C_9H_{19})_2(C_7H_{15})]X$, $[N(C_5H_{11})(C_9H_{19})(C_8H_{17})_2]X$, $[N(C_5H_{11})(C_9H_{19})_2(C_8H_{17})]X$, $[N(C_5H_{11})(C_8H_{17})(C_6H_{13})_2]X$, $[N(C_5H_{11})(C_8H_{17})_2(C_6H_{13})]X$, $[N(C_5H_{11})(C_8H_{17})(C_7H_{15})_2]X$, $[N(C_5H_{11})(C_8H_{17})_2(C_7H_{15})]X$, $[N(C_5H_{11})(C_7H_{15})(C_6H_{13})_2]X$, $[N(C_5H_{11})(C_7H_{15})_2(C_6H_{13})]X$, $[N(C_6H_{13})(C_{10}H_{21})(C_7H_{15})_2]X$, $[N(C_6H_{13})(C_{10}H_{21})_2(C_7H_{15})]X$, $[N(C_6H_{13})(C_{10}H_{21})(C_8H_{17})_2]X$, $[N(C_6H_{13})(C_{10}H_{21})_2(C_8H_{17})]X$, $[N(C_6H_{13})(C_{10}H_{21})(C_9H_{19})_2]X$, $[N(C_6H_{13})(C_{10}H_{21})_2(C_9H_{19})]X$, $[N(C_6H_{13})(C_9H_{19})(C_7H_{15})_2]X$, $[N(C_6H_{13})(C_9H_{19})_2(C_7H_{15})]X$, $[N(C_6H_{13})(C_9H_{19})(C_8H_{17})_2]X$, $[N(C_6H_{13})(C_9H_{19})_2(C_8H_{17})]X$, $[N(C_6H_{13})(C_8H_{17})(C_7H_{15})_2]X$, $[N(C_6H_{13})(C_8H_{17})_2(C_7H_{15})]X$, $[N(C_7H_{15})(C_{10}H_{21})(C_8H_{17})_2]X$, $[N(C_7H_{15})(C_{10}H_{21})_2(C_8H_{17})]X$, $[N(C_7H_{15})(C_{10}H_{21})(C_9H_{19})_2]X$, $[N(C_7H_{15})(C_{10}H_{21})_2(C_9H_{19})]X$, $[N(C_7H_{15})(C_9H_{19})(C_8H_{17})_2]X$, $[N(C_7H_{15})(C_9H_{19})_2(C_8H_{17})]X$, $[N(C_8H_{17})(C_{10}H_{21})(C_9H_{19})_2]X$, $[N(C_8H_{17})(C_{10}H_{21})_2(C_9H_{19})]X$, $[P(CH_3)_4]X$, $[P(C_2H_5)_4]X$, $[P(C_3H_7)_4]X$, $[P(C_4H_9)_4]X$, $[P(C_5H_{11})_4]X$, $[P(C_6H_{13})_4]X$, $[P(C_7H_{15})_4]X$, $[P(C_8H_{17})_4]X$, $[P(C_9H_{19})_4]X$, $[P(C_{10}H_{21})_4]X$, $[P(C_2H_5)(CH_3)_3]X$, $[P(C_2H_5)_2(CH_3)_2]X$, $[P(C_2H_5)_3(CH_3)]X$, $[P(C_3H_7)(CH_3)_3]X$, $[P(C_3H_7)_2(CH_3)_2]X$, $[P(C_3H_7)_3(CH_3)]X$, $[P(C_4H_9)(CH_3)_3]X$, $[P(C_4H_9)_2(CH_3)_2]X$, $[P(C_4H_9)_3(CH_3)]X$, $[P(C_5H_{11})(CH_3)_3]X$, $[P(C_5H_{11})_2(CH_3)_2]X$, $[P(C_5H_{11})_3(CH_3)]X$, $[P(C_6H_{13})(CH_3)_3]X$, $[P(C_6H_{13})_2(CH_3)_2]X$, $[P(C_6H_{13})_3(CH_3)]X$, $[P(C_7H_{15})(CH_3)_3]X$, $[P(C_7H_{15})_2(CH_3)_2]X$, $[P(C_7H_{15})_3(CH_3)]X$, $[P(C_8H_{17})(CH_3)_3]X$, $[P(C_8H_{17})_2(CH_3)_2]X$, $[P(C_8H_{17})_3(CH_3)]X$, $[P(C_9H_{19})(CH_3)_3]X$, $[P(C_9H_{19})_2(CH_3)_2]X$, $[P(C_9H_{19})_3(CH_3)]X$, $[P(C_{10}H_{21})(CH_3)_3]X$, $[P(C_{10}H_{21})_2(CH_3)_2]X$, $[P(C_{10}H_{21})_3(CH_3)]X$, $[P(C_3H_7)(C_2H_5)_3]X$, $[P(C_3H_7)_2(C_2H_5)_2]X$, $[P(C_3H_7)_3(C_2H_5)]X$, $[P(C_4H_9)(C_2H_5)_3]X$, $[P(C_4H_9)_2(C_2H_5)_2]X$, $[P(C_4H_9)_3(C_2H_5)]X$, $[P(C_5H_{11})(C_2H_5)_3]X$, $[P(C_5H_{11})_2(C_2H_5)_2]X$, $[P(C_5H_{11})_3(C_2H_5)]X$, $[P(C_6H_{13})(C_2H_5)_3]X$, $[P(C_6H_{13})_2(C_2H_5)_2]X$, $[P(C_6H_{13})_3(C_2H_5)]X$, $[P(C_7H_{15})(C_2H_5)_3]X$, $[P(C_7H_{15})_2(C_2H_5)_2]X$, $[P(C_7H_{15})_3(C_2H_5)]X$, $[P(C_8H_{17})(C_2H_5)_3]X$, $[P(C_8H_{17})_2(C_2H_5)_2]X$, $[P(C_8H_{17})_3(C_2H_5)]X$, $[P(C_9H_{19})(C_2H_5)_3]X$, $[P(C_9H_{19})_2(C_2H_5)_2]X$, $[P(C_9H_{19})_3(C_2H_5)]X$, $[P(C_{10}H_{21})(C_2H_5)_3]X$, $[P(C_{10}H_{21})_2(C_2H_5)_2]X$, $[P(C_{10}H_{21})_3(C_2H_5)]X$, $[P(C_4H_9)(C_3H_7)_3]X$, $[P(C_4H_9)_2(C_3H_7)_2]X$, $[P(C_4H_9)_3(C_3H_7)]X$, $[P(C_5H_{11})(C_3H_7)_3]X$, $[P(C_5H_{11})_2(C_3H_7)_2]X$, $[P(C_5H_{11})_3(C_3H_7)]X$, $[P(C_6H_{13})(C_3H_7)_3]X$, $[P(C_6H_{13})_2(C_3H_7)_2]X$, $[P(C_6H_{13})_3(C_3H_7)]X$, $[P(C_7H_{15})(C_3H_7)_3]X$, $[P(C_7H_{15})_2(C_3H_7)_2]X$, $[P(C_7H_{15})_3(C_3H_7)]X$, $[P(C_8H_{17})(C_3H_7)_3]X$, $[P(C_8H_{17})_2(C_3H_7)_2]X$, $[P(C_8H_{17})_3(C_3H_7)]X$, $[P(C_9H_{19})(C_3H_7)_3]X$, $[P(C_9H_{19})_2(C_3H_7)_2]X$, $[P(C_9H_{19})_3(C_3H_7)]X$, $[P(C_{10}H_{21})(C_3H_7)_3]X$, $[P(C_{10}H_{21})_2(C_3H_7)_2]X$, $[P(C_{10}H_{21})_3(C_3H_7)]X$, $[P(C_5H_{11})(C_4H_9)_3]X$, $[P(C_5H_{11})_2(C_4H_9)_2]X$, $[P(C_5H_{11})_3(C_4H_9)]X$, $[P(C_6H_{13})(C_4H_9)_3]X$, $[P(C_6H_{13})_2(C_4H_9)_2]X$, $[P(C_6H_{13})_3(C_4H_9)]X$, $[P(C_7H_{15})(C_4H_9)_3]X$, $[P(C_7H_{15})_2(C_4H_9)_2]X$, $[P(C_7H_{15})_3(C_4H_9)]X$, $[P(C_8H_{17})(C_4H_9)_3]X$, $[P(C_8H_{17})_2(C_4H_9)_2]X$, $[P(C_8H_{17})_3(C_4H_9)]X$, $[P(C_9H_{19})(C_4H_9)_3]X$, $[P(C_9H_{19})_2(C_4H_9)_2]X$, $[P(C_9H_{19})_3(C_4H_9)]X$, $[P(C_{10}H_{21})(C_4H_9)_3]X$, $[P(C_{10}H_{21})_2(C_4H_9)_2]X$, $[P(C_{10}H_{21})_3(C_4H_9)]X$, $[P(C_6H_{13})(C_5H_{11})_3]X$, $[P(C_6H_{13})_2(C_5H_{11})_2]X$, $[P(C_6H_{13})_3(C_5H_{11})]X$, $[P(C_7H_{15})(C_5H_{11})_3]X$, $[P(C_7H_{15})_2(C_5H_{11})_2]X$, $[P(C_7H_{15})_3(C_5H_{11})]X$, $[P(C_8H_{17})(C_5H_{11})_3]X$, $[P(C_8H_{17})_2(C_5H_{11})_2]X$, $[P(C_8H_{17})_3(C_5H_{11})]X$, $[P(C_9H_{19})(C_5H_{11})_3]X$, $[P(C_9H_{19})_2(C_5H_{11})_2]X$, $[P(C_9H_{19})_3(C_5H_{11})]X$, $[P(C_{10}H_{21})(C_5H_{11})_3]X$, $[P(C_{10}H_{21})_2(C_5H_{11})_2]X$, $[P(C_{10}H_{21})_3(C_5H_{11})]X$, $[P(C_7H_{15})(C_6H_{13})_3]X$, $[P(C_7H_{15})_2(C_6H_{13})_2]X$, $[P(C_7H_{15})_3(C_6H_{13})]X$, $[P(C_8H_{17})(C_6H_{13})_3]X$, $[P(C_8H_{17})_2(C_6H_{13})_2]X$, $[P(C_8H_{17})_3(C_6H_{13})]X$, $[P(C_9H_{19})(C_6H_{13})_3]X$, $[P(C_9H_{19})_2(C_6H_{13})_2]X$, $[P(C_9H_{19})_3(C_6H_{13})]X$, $[P(C_{10}H_{21})(C_6H_{13})_3]X$, $[P(C_{10}H_{21})_2(C_6H_{13})_2]X$, $[P(C_{10}H_{21})_3(C_6H_{13})]X$, $[P(C_8H_{17})(C_7H_{15})_3]X$, $[P(C_8H_{17})_2(C_7H_{15})_2]X$, $[P(C_8H_{17})_3(C_7H_{15})]X$, $[P(C_9H_{19})(C_7H_{15})_3]X$, $[P(C_9H_{19})_2(C_7H_{15})_2]X$, $[P(C_9H_{19})_3(C_7H_{15})]X$, $[P(C_{10}H_{21})(C_7H_{15})_3]X$, $[P(C_{10}H_{21})_2(C_7H_{15})_2]X$, $[P(C_{10}H_{21})_3(C_7H_{15})]X$, $[P(C_9H_{19})(C_8H_{17})_3]X$, $[P(C_9H_{19})_2(C_8H_{17})_2]X$, $[P(C_9H_{19})_3(C_8H_{17})]X$, $[P(C_{10}H_{21})(C_8H_{17})_3]X$, $[P(C_{10}H_{21})_2(C_8H_{17})_2]X$, $[P(C_{10}H_{21})_3(C_8H_{17})]X$, $[P(C_{10}H_{21})(C_9H_{19})_3]X$, $[P(C_{10}H_{21})_2(C_9H_{19})_2]X$, $[P(C_{10}H_{21})_3(C_9H_{19})]X$, $[P(CH_3)(C_{10}H_{21})(C_2H_5)_2]X$, $[P(CH_3)(C_{10}H_{21})_2(C_2H_5)]X$, $[P(CH_3)(C_{10}H_{21})(C_3H_7)_2]X$, $[P(CH_3)(C_{10}H_{21})_2(C_3H_7)]X$, $[P(CH_3)(C_{10}H_{21})(C_4H_9)_2]X$, $[P(CH_3)(C_{10}H_{21})_2(C_4H_9)]X$, $[P(CH_3)(C_{10}H_{21})(C_5H_{11})_2]X$, $[P(CH_3)(C_{10}H_{21})_2(C_5H_{11})]X$, $[P(CH_3)(C_{10}H_{21})(C_6H_{13})_2]X$, $[P(CH_3)(C_{10}H_{21})_2(C_6H_{13})]X$, $[P(CH_3)(C_{10}H_{21})(C_7H_{15})_2]X$, $[P(CH_3)(C_{10}H_{21})_2(C_7H_{15})]X$,

[P(CH$_3$)(C$_{10}$H$_{21}$)(C$_8$H$_{17}$)$_2$]X, [P(CH$_3$)(C$_{10}$H$_{21}$)$_2$(C$_8$H$_{17}$)]X,

[P(CH$_3$)(C$_{10}$H$_{21}$)(C$_9$H$_{19}$)$_2$]X, [P(CH$_3$)(C$_{10}$H$_{21}$)$_2$(C$_9$H$_{19}$)]X,

[P(CH$_3$)(C$_9$H$_{19}$)(C$_2$H$_5$)$_2$]X, [P(CH$_3$)(C$_9$H$_{19}$)$_2$(C$_2$H$_5$)]X,
[P(CH$_3$)(C$_9$H$_{19}$)(C$_3$H$_7$)$_2$]X, [P(CH$_3$)(C$_9$H$_{19}$)$_2$(C$_3$H$_7$)]X,
[P(CH$_3$)(C$_9$H$_{19}$)(C$_4$H$_9$)$_2$]X, [P(CH$_3$)(C$_9$H$_{19}$)$_2$(C$_4$H$_9$)]X,
[P(CH$_3$)(C$_9$H$_{19}$)(C$_5$H$_{11}$)$_2$]X, [P(CH$_3$)(C$_9$H$_{19}$)$_2$(C$_5$H$_{11}$)]X,

[P(CH$_3$)(C$_9$H$_{19}$)(C$_6$H$_{13}$)$_2$]X, [P(CH$_3$)(C$_9$H$_{19}$)$_2$(C$_6$H$_{13}$)]X,

[P(CH$_3$)(C$_9$H$_{19}$)(C$_7$H$_{15}$)$_2$]X, [P(CH$_3$)(C$_9$H$_{19}$)$_2$(C$_7$H$_{15}$)]X,

[P(CH$_3$)(C$_9$H$_{19}$)(C$_8$H$_{17}$)$_2$]X, [P(CH$_3$)(C$_9$H$_{19}$)$_2$(C$_8$H$_{17}$)]X,

[P(CH$_3$)(C$_8$H$_{17}$)(C$_2$H$_5$)$_2$]X, [P(CH$_3$)(C$_8$H$_{17}$)$_2$(C$_2$H$_5$)]X,
[P(CH$_3$)(C$_8$H$_{17}$)(C$_3$H$_7$)$_2$]X, [P(CH$_3$)(C$_8$H$_{17}$)$_2$(C$_3$H$_7$)]X,
[P(CH$_3$)(C$_8$H$_{17}$)(C$_4$H$_9$)$_2$]X, [P(CH$_3$)(C$_8$H$_{17}$)$_2$(C$_4$H$_9$)]X,
[P(CH$_3$)(C$_8$H$_{17}$)(C$_5$H$_{11}$)$_2$]X, [P(CH$_3$)(C$_8$H$_{17}$)$_2$(C$_5$H$_{11}$)]X,

[P(CH$_3$)(C$_8$H$_{17}$)(C$_6$H$_{13}$)$_2$]X, [P(CH$_3$)(C$_8$H$_{17}$)$_2$(C$_6$H$_{13}$)]X,

[P(CH$_3$)(C$_8$H$_{17}$)(C$_7$H$_{15}$)$_2$]X, [P(CH$_3$)(C$_8$H$_{17}$)$_2$(C$_7$H$_{15}$)]X,

[P(CH$_3$)(C$_7$H$_{15}$)(C$_2$H$_5$)$_2$]X, [P(CH$_3$)(C$_7$H$_{15}$)$_2$(C$_2$H$_5$)]X,
[P(CH$_3$)(C$_7$H$_{15}$)(C$_3$H$_7$)$_2$]X, [P(CH$_3$)(C$_7$H$_{15}$)$_2$(C$_3$H$_7$)]X,
[P(CH$_3$)(C$_7$H$_{15}$)(C$_4$H$_9$)$_2$]X, [P(CH$_3$)(C$_7$H$_{15}$)$_2$(C$_4$H$_9$)]X,
[P(CH$_3$)(C$_7$H$_{15}$)(C$_5$H$_{11}$)$_2$]X, [P(CH$_3$)(C$_7$H$_{15}$)$_2$(C$_5$H$_{11}$)]X,

[P(CH$_3$)(C$_7$H$_{15}$)(C$_6$H$_{13}$)$_2$]X, [P(CH$_3$)(C$_7$H$_{15}$)$_2$(C$_6$H$_{13}$)]X,

[P(CH$_3$)(C$_6$H$_{13}$)(C$_2$H$_5$)$_2$]X, [P(CH$_3$)(C$_6$H$_{13}$)$_2$(C$_2$H$_5$)]X,
[P(CH$_3$)(C$_6$H$_{13}$)(C$_3$H$_7$)$_2$]X, [P(CH$_3$)(C$_6$H$_{13}$)$_2$(C$_3$H$_7$)]X,
[P(CH$_3$)(C$_6$H$_{13}$)(C$_4$H$_9$)$_2$]X, [P(CH$_3$)(C$_6$H$_{13}$)$_2$(C$_4$H$_9$)]X,
[P(CH$_3$)(C$_6$H$_{13}$)(C$_5$H$_{11}$)$_2$]X, [P(CH$_3$)(C$_6$H$_{13}$)$_2$(C$_5$H$_{11}$)]X,

[P(CH$_3$)(C$_5$H$_{11}$)(C$_2$H$_5$)$_2$]X, [P(CH$_3$)(C$_5$H$_{11}$)$_2$(C$_2$H$_5$)]X,
[P(CH$_3$)(C$_5$H$_{11}$)(C$_3$H$_7$)$_2$]X, [P(CH$_3$)(C$_5$H$_{11}$)$_2$(C$_3$H$_7$)]X,
[P(CH$_3$)(C$_5$H$_{11}$)(C$_4$H$_9$)$_2$]X, [P(CH$_3$)(C$_5$H$_{11}$)$_2$(C$_4$H$_9$)]X,
[P(CH$_3$)(C$_4$H$_9$)(C$_2$H$_5$)$_2$]X, [P(CH$_3$)(C$_4$H$_9$)$_2$(C$_2$H$_5$)]X,
[P(CH$_3$)(C$_4$H$_9$)(C$_3$H$_7$)$_2$]X, [P(CH$_3$)(C$_4$H$_9$)$_2$(C$_3$H$_7$)]X,
[P(CH$_3$)(C$_3$H$_7$)(C$_2$H$_5$)$_2$]X, [P(CH$_3$)(C$_3$H$_7$)$_2$(C$_2$H$_5$)]X,
[P(C$_2$H$_5$)(C$_{10}$H$_{21}$)(C$_3$H$_7$)$_2$]X, [P(C$_2$H$_5$)(C$_{10}$H$_{21}$)$_2$(C$_3$H$_7$)]X,

[P(C$_2$H$_5$)(C$_{10}$H$_{21}$)(C$_4$H$_9$)$_2$]X, [P(C$_2$H$_5$)(C$_{10}$H$_{21}$)$_2$(C$_4$H$_9$)]X,

[P(C$_2$H$_5$)(C$_{10}$H$_{21}$)(C$_5$H$_{11}$)$_2$]X, [P(C$_2$H$_5$)(C$_{10}$H$_{21}$)$_2$(C$_5$H$_{11}$)]X,

[P(C$_2$H$_5$)(C$_{10}$H$_{21}$)(C$_6$H$_{13}$)$_2$]X, [P(C$_2$H$_5$)(C$_{10}$H$_{21}$)$_2$(C$_6$H$_{13}$)]X,

[P(C$_2$H$_5$)(C$_{10}$H$_{21}$)(C$_7$H$_{15}$)$_2$]X, [P(C$_2$H$_5$)(C$_{10}$H$_{21}$)$_2$(C$_7$H$_{15}$)]X,

[P(C$_2$H$_5$)(C$_{10}$H$_{21}$)(C$_8$H$_{17}$)$_2$]X, [P(C$_2$H$_5$)(C$_{10}$H$_{21}$)$_2$(C$_8$H$_{17}$)]X,

[P(C$_2$H$_5$)(C$_{10}$H$_{21}$)(C$_9$H$_{19}$)$_2$]X, [P(C$_2$H$_5$)(C$_{10}$H$_{21}$)$_2$(C$_9$H$_{19}$)]X,

[P(C$_2$H$_5$)(C$_9$H$_{19}$)(C$_3$H$_7$)$_2$]X, [P(C$_2$H$_5$)(C$_9$H$_{19}$)$_2$(C$_3$H$_7$)]X,

[P(C$_2$H$_5$)(C$_9$H$_{19}$)(C$_4$H$_9$)$_2$]X, [P(C$_2$H$_5$)(C$_9$H$_{19}$)$_2$(C$_4$H$_9$)]X,

[P(C$_2$H$_5$)(C$_9$H$_{19}$)(C$_5$H$_{11}$)$_2$]X, [P(C$_2$H$_5$)(C$_9$H$_{19}$)$_2$(C$_5$H$_{11}$)]X,

[P(C$_2$H$_5$)(C$_9$H$_{19}$)(C$_6$H$_{13}$)$_2$]X, [P(C$_2$H$_5$)(C$_9$H$_{19}$)$_2$(C$_6$H$_{13}$)]X,

[P(C$_2$H$_5$)(C$_9$H$_{19}$)(C$_7$H$_{15}$)$_2$]X, [P(C$_2$H$_5$)(C$_9$H$_{19}$)$_2$(C$_7$H$_{15}$)]X,

[P(C$_2$H$_5$)(C$_9$H$_{19}$)(C$_8$H$_{17}$)$_2$]X, [P(C$_2$H$_5$)(C$_9$H$_{19}$)$_2$(C$_8$H$_{17}$)]X,

[P(C$_2$H$_5$)(C$_8$H$_{17}$)(C$_3$H$_7$)$_2$]X, [P(C$_2$H$_5$)(C$_8$H$_{17}$)$_2$(C$_3$H$_7$)]X,

[P(C$_2$H$_5$)(C$_8$H$_{17}$)(C$_4$H$_9$)$_2$]X, [P(C$_2$H$_5$)(C$_8$H$_{17}$)$_2$(C$_4$H$_9$)]X,

[P(C$_2$H$_5$)(C$_8$H$_{17}$)(C$_5$H$_{11}$)$_2$]X, [P(C$_2$H$_5$)(C$_8$H$_{17}$)$_2$(C$_5$H$_{11}$)]X,

[P(C$_2$H$_5$)(C$_6$H$_{17}$)(C$_6$H$_{13}$)$_2$]X, [P(C$_2$H$_5$)(C$_6$H$_{17}$)$_2$(C$_6$H$_{13}$)]X,

[P(C$_2$H$_5$)(C$_8$H$_{17}$)(C$_7$H$_{15}$)$_2$]X, [P(C$_2$H$_5$)(C$_8$H$_{17}$)$_2$(C$_7$H$_{15}$)]X,

[P(C$_2$H$_5$)(C$_7$H$_{15}$)(C$_3$H$_7$)$_2$]X, [P(C$_2$H$_5$)(C$_7$H$_{15}$)$_2$(C$_3$H$_7$)]X,

[P(C$_2$H$_5$)(C$_7$H$_{15}$)(C$_4$H$_9$)$_2$]X, [P(C$_2$H$_5$)(C$_7$H$_{15}$)$_2$(C$_4$H$_9$)]X,

[P(C$_2$H$_5$)(C$_7$H$_{15}$)(C$_5$H$_{11}$)$_2$]X, [P(C$_2$H$_5$)(C$_7$H$_{15}$)$_2$(C$_5$H$_{11}$)]X,

[P(C$_2$H$_5$)(C$_7$H$_{15}$)(C$_6$H$_{13}$)$_2$]X, [P(C$_2$H$_5$)(C$_7$H$_{15}$)$_2$(C$_6$H$_{13}$)]X,

[P(C$_2$H$_5$)(C$_6$H$_{13}$)(C$_3$H$_7$)$_2$]X, [P(C$_2$H$_5$)(C$_6$H$_{13}$)$_2$(C$_3$H$_7$)]X,

[P(C$_2$H$_5$)(C$_6$H$_{13}$)(C$_4$H$_9$)$_2$]X, [P(C$_2$H$_5$)(C$_6$H$_{13}$)$_2$(C$_4$H$_9$)]X,

[P(C$_2$H$_5$)(C$_6$H$_{13}$)(C$_5$H$_{11}$)$_2$]X, [P(C$_2$H$_5$)(C$_6$H$_{13}$)$_2$(C$_5$H$_{11}$)]X,

[P(C$_2$H$_5$)(C$_5$H$_{11}$)(C$_3$H$_7$)$_2$]X, [P(C$_2$H$_5$)(C$_5$H$_{11}$)$_2$(C$_3$H$_7$)]X,

[P(C$_2$H$_5$)(C$_5$H$_{11}$)(C$_4$H$_9$)$_2$]X, [P(C$_2$H$_5$)(C$_5$H$_{11}$)$_2$(C$_4$H$_9$)]X,

[P(C$_2$H$_5$)(C$_4$H$_9$)(C$_3$H$_7$)$_2$]X, [P(C$_3$H$_7$)(C$_4$H$_9$)$_2$(C$_3$H$_7$)]X,
[P(C$_3$H$_7$)(C$_{10}$H$_{21}$)(C$_4$H$_9$)$_2$]X, [P(C$_3$H$_7$)(C$_{10}$H$_{21}$)$_2$(C$_4$H$_9$)]X,

[P(C$_3$H$_7$)(C$_{10}$H$_{21}$)(C$_5$H$_{11}$)$_2$]X, [P(C$_3$H$_7$)(C$_{10}$H$_{21}$)$_2$(C$_5$H$_{11}$)]X,

[P(C$_3$H$_7$)(C$_{10}$H$_{21}$)(C$_6$H$_{13}$)$_2$]X, [P(C$_3$H$_7$)(C$_{10}$H$_{21}$)$_2$(C$_6$H$_{13}$)]X,

[P(C$_3$H$_7$)(C$_{10}$H$_{21}$)(C$_7$H$_{15}$)$_2$]X, [P(C$_3$H$_7$)(C$_{10}$H$_{21}$)$_2$(C$_7$H$_{15}$)]X,

[P(C$_3$H$_7$)(C$_{10}$H$_{21}$)(C$_8$H$_{17}$)$_2$]X, [P(C$_3$H$_7$)(C$_{10}$H$_{21}$)$_2$(C$_8$H$_{17}$)]X,

[P(C$_3$H$_7$)(C$_{10}$H$_{21}$)(C$_9$H$_{19}$)$_2$]X, [P(C$_3$H$_7$)(C$_{10}$H$_{21}$)$_2$(C$_9$H$_{19}$)]X,

[P(C$_3$H$_7$)(C$_9$H$_{19}$)(C$_4$H$_9$)$_2$]X, [P(C$_3$H$_7$)(C$_9$H$_{19}$)$_2$(C$_4$H$_9$)]X,

[P(C$_3$H$_7$)(C$_9$H$_{19}$)(C$_5$H$_{11}$)$_2$]X, [P(C$_3$H$_7$)(C$_9$H$_{19}$)$_2$(C$_5$H$_{11}$)]X,

[P(C$_3$H$_7$)(C$_9$H$_{19}$)(C$_6$H$_{13}$)$_2$]X, [P(C$_3$H$_7$)(C$_9$H$_{19}$)$_2$(C$_6$H$_{13}$)]X,

[P(C$_3$H$_7$)(C$_9$H$_{19}$)(C$_7$H$_{15}$)$_2$]X, [P(C$_3$H$_7$)(C$_9$H$_{19}$)$_2$(C$_7$H$_{15}$)]X,

[P(C$_3$H$_7$)(C$_9$H$_{19}$)(C$_8$H$_{17}$)$_2$]X, [P(C$_3$H$_7$)(C$_9$H$_{19}$)$_2$(C$_8$H$_{17}$)]X,

[P(C$_3$H$_7$)(C$_8$H$_{17}$)(C$_4$H$_9$)$_2$]X, [P(C$_3$H$_7$)(C$_8$H$_{17}$)$_2$(C$_4$H$_9$)]X,

[P(C$_3$H$_7$)(C$_8$H$_{17}$)(C$_5$H$_{11}$)$_2$]X, [P(C$_3$H$_7$)(C$_8$H$_{17}$)$_2$(C$_5$H$_{11}$)]X,

[P(C$_3$H$_7$)(C$_8$H$_{17}$)(C$_6$H$_{13}$)$_2$]X, [P(C$_3$H$_7$)(C$_8$H$_{17}$)$_2$(C$_6$H$_{13}$)]X,

[P(C$_3$H$_7$)(C$_8$H$_{17}$)(C$_7$H$_{15}$)$_2$]X, [P(C$_3$H$_7$)(C$_8$H$_{17}$)$_2$(C$_7$H$_{15}$)]X,

[P(C$_3$H$_7$)(C$_7$H$_{15}$)(C$_4$H$_9$)$_2$]X, [P(C$_3$H$_7$)(C$_7$H$_{15}$)$_2$(C$_4$H$_9$)]X,

[P(C$_3$H$_7$)(C$_7$H$_{15}$)(C$_5$H$_{11}$)$_2$]X, [P(C$_3$H$_7$)(C$_7$H$_{15}$)$_2$(C$_5$H$_{11}$)]X,

[P(C$_3$H$_7$)(C$_7$H$_{15}$)(C$_6$H$_{13}$)$_2$]X, [P(C$_3$H$_7$)(C$_7$H$_{15}$)$_2$(C$_6$H$_{13}$)]X, $[P(C_3H_7)(C_6H_{13})(C_4H_9)_2]X$,  $[P(C_3H_7)(C_6H_{13})_2(C_4H_9)]X$, $[P(C_3H_7)(C_6H_{13})(C_5H_{11})_2]X$, $[P(C_3H_7)(C_6H_{13})_2(C_5H_{11})]X$, $[P(C_3H_7)(C_5H_{11})(C_4H_9)_2]X$,  $[P(C_3H_7)(C_5H_{11})_2(C_4H_9)]X$, $[P(C_4H_9)(C_{10}H_{21})(C_5H_{11})_2]X$,  $[P(C_4H_9)(C_{10}H_{21})_2(C_5H_{11})]X$, $[P(C_4H_9)(C_{10}H_{21})(C_6H_{13})_2]X$,  $[P(C_4H_9)(C_{10}H_{21})_2(C_6H_{13})]X$, $[P(C_4H_9)(C_{10}H_{21})(C_7H_{15})_2]X$,  $[P(C_4H_9)(C_{10}H_{21})_2(C_7H_{15})]X$, $[P(C_4H_9)(C_{10}H_{21})(C_8H_{17})_2]X$,  $[P(C_4H_9)(C_{10}H_{21})_2(C_8H_{17})]X$, $[P(C_4H_9)(C_{10}H_{21})(C_9H_{19})_2]X$,  $[P(C_4H_9)(C_{10}H_{21})_2(C_9H_{19})]X$, $[P(C_4H_9)(C_9H_{19})(C_5H_{11})_2]X$, $[P(C_4H_9)(C_9H_{19})_2(C_5H_{11})]X$, $[P(C_4H_9)(C_9H_{19})(C_6H_{13})_2]X$, $[P(C_4H_9)(C_9H_{19})_2(C_6H_{13})]X$, $[P(C_4H_9)(C_9H_{19})(C_7H_{15})_2]X$, $[P(C_4H_9)(C_9H_{19})_2(C_7H_{15})]X$, $[P(C_4H_9)(C_9H_{19})(C_8H_{17})_2]X$, $[P(C_4H_9)(C_9H_{19})_2(C_8H_{17})]X$, $[P(C_4H_9)(C_8H_{17})(C_5H_{11})_2]X$, $[P(C_4H_9)(C_8H_{17})_2(C_5H_{11})]X$, $[P(C_4H_9)(C_8H_{17})(C_6H_{13})_2]X$, $[P(C_4H_9)(C_8H_{17})_2(C_6H_{13})]X$, $[P(C_4H_9)(C_8H_{17})(C_7H_{15})_2]X$, $[P(C_4H_9)(C_8H_{17})_2(C_7H_{15})]X$, $[P(C_4H_9)(C_7H_{15})(C_5H_{11})_2]X$, $[P(C_4H_9)(C_7H_{15})_2(C_5H_{11})]X$, $[P(C_4H_9)(C_7H_{15})(C_6H_{13})_2]X$, $[P(C_4H_9)(C_7H_{15})_2(C_6H_{13})]X$, $[P(C_4H_9)(C_6H_{13})(C_5H_{11})_2]X$, $[P(C_4H_9)(C_6H_{13})_2(C_5H_{11})]X$, $[P(C_5H_{11})(C_{10}H_{21})(C_6H_{13})_2]X$,  $[P(C_5H_{11})(C_{10}H_{21})_2(C_6H_{13})]X$, $[P(C_5H_{11})(C_{10}H_{21})(C_7H_{15})_2]X$,  $[P(C_5H_{11})(C_{10}H_{21})_2(C_7H_{15})]X$, $[P(C_5H_{11})(C_{10}H_{21})(C_8H_{17})_2]X$,  $[P(C_5H_{11})(C_{10}H_{21})_2(C_8H_{17})]X$, $[P(C_5H_{11})(C_{10}H_{21})(C_9H_{19})_2]X$,  $[P(C_5H_{11})(C_{10}H_{21})_2(C_9H_{19})]X$, $[P(C_5H_{11})(C_9H_{19})(C_6H_{13})_2]X$,  $[P(C_5H_{11})(C_9H_{19})_2(C_6H_{13})]X$, $[P(C_5H_{11})(C_9H_{19})(C_7H_{15})_2]X$,  $[P(C_5H_{11})(C_9H_{19})_2(C_7H_{15})]X$, $[P(C_5H_{11})(C_9H_{19})(C_8H_{17})_2]X$,  $[P(C_5H_{11})(C_9H_{19})_2(C_8H_{17})]X$, $[P(C_5H_{11})(C_8H_{17})(C_6H_{13})_2]X$,  $[P(C_5H_{11})(C_8H_{17})_2(C_6H_{13})]X$, $[P(C_5H_{11})(C_8H_{17})(C_7H_{15})_2]X$,  $[P(C_5H_{11})(C_8H_{17})_2(C_7H_{15})]X$, $[P(C_5H_{11})(C_7H_{15})(C_6H_{13})_2]X$,  $[P(C_5H_{11})(C_7H_{15})_2(C_6H_{13})]X$, $[P(C_6H_{13})(C_{10}H_{21})(C_7H_{15})_2]X$,  $[P(C_6H_{13})(C_{10}H_{21})_2(C_7H_{15})]X$, $[P(C_6H_{13})(C_{10}H_{21})(C_8H_{17})_2]X$,  $[P(C_6H_{13})(C_{10}H_{21})_2(C_8H_{17})]X$, $[P(C_6H_{13})(C_{10}H_{21})(C_9H_{19})_2]X$,  $[P(C_6H_{13})(C_{10}H_{21})_2(C_9H_{19})]X$, $[P(C_6H_{13})(C_9H_{19})(C_7H_{15})_2]X$,  $[P(C_6H_{13})(C_9H_{19})_2(C_7H_{15})]X$, $[P(C_6H_{13})(C_9H_{19})(C_8H_{17})_2]X$,  $[P(C_6H_{13})(C_9H_{19})_2(C_8H_{17})]X$, $[P(C_6H_{13})(C_8H_{17})(C_7H_{15})_2]X$,  $[P(C_6H_{13})(C_8H_{17})_2(C_7H_{15})]X$, $[P(C_7H_{15})(C_{10}H_{21})(C_8H_{17})_2]X$,  $[P(C_7H_{15})(C_{10}H_{21})_2(C_8H_{17})]X$, $[P(C_7H_{15})(C_{10}H_{21})(C_9H_{19})_2]X$,  $[P(C_7H_{15})(C_{10}H_{21})_2(C_9H_{19})]X$, $[P(C_7H_{15})(C_9H_{19})(C_8H_{17})_2]X$,  $[P(C_7H_{15})(C_9H_{19})_2(C_8H_{17})]X$, $[P(C_8H_{17})(C_{10}H_{21})(C_9H_{19})_2]X$,  $[P(C_8H_{17})(C_{10}H_{21})_2(C_9H_{19})]X$.

The base used may be $M_{3-w}CO_3$, $M(OH)_w$, $M_{3-w}(HPO_4)$, $M(H_2PO_4)_w$, $M_3(PO_4)_w$, where w is 1 or 2, and M=Na or K when w=1, and M=Ca or Mg when w=2. The base used may preferably be $Na_2CO_3$ or NaOH.

The process according to the invention for preparation of polysulfane silanes of the formula I can be performed at temperatures of 25° C. to 200° C., preferably 70° C. to 160° C.

In the process according to the invention for preparation of polysulfane silanes of the formula I, the phase transfer catalyst of the formula III and then the silane of the formula II may be added to the aqueous phase, prepared by $M(SH)_y$, preferably NaSH, and/or MIS, preferably $Na_2S$, and/or $M_gS_h$, a base, preferably NaOH or $Na_2CO_3$, and sulfur in aqueous solution/suspension.

In the process according to the invention for preparation of polysulfane silanes of the formula I, $M(SH)_y$ and/or MIS and/or $M_gS_h$ may be prepared from MOH and sulfur in situ.

The molar ratio between the silane of the formula II used and the NaSH used may be between 0.35 and 1.0, preferably between 0.45 and 0.55.

The molar ratio between the silane of the formula II used and the base may be between 0.35 and 1.0, preferably between 0.45 and 0.60.

The molar ratio between the silane of the formula II used and sulfur may be between 0.4 and 3.0, preferably between 0.5 and 1.5.

The molar ratio between the silane of the formula II used and the phase transfer catalyst of the formula III may be between 0.001 and 0.1, preferably between 0.003 and 0.05.

The process according to the invention for preparation of polysulfane silanes of the formula I can be performed without organic solvent. The aqueous phase used may contain process salts from the preceding batch. During the preparation of the aqueous phase, the amount of the phase transfer catalyst of the formula III may be added in part or in full. In the case of partial addition of the phase transfer catalyst of the formula III, the residual amount may be added in portions or continuously, preferably continuously, during the metered addition of the silane of the formula II. The $M(SH)_y$ and/or MIS and/or $M_gS_h$ used for preparation of polysulfane silanes of the formula I may be prepared before or during the reaction.

In the reaction, the aqueous phase may be mixed with the silane of the formula II. It is possible here either to meter the aqueous phase into the silane of the formula II or to meter the silane of the formula II into the aqueous phase. The silane of the formula II is preferably metered into the aqueous phase. During the reaction, the silane of the formula II may be added in portions or continuously, preferably continuously.

The process according to the invention may be carried out in a reaction vessel closed or open to the atmosphere. The contents of the reaction vessel may be mixed. Suitable means of mixing the contents of the reaction vessel are by external circulation or agitation of the contents of the reaction vessel by means of gases or stirrer systems, preferably stirrer systems. The process can be performed continuously or batchwise.

Any portions of the phase transfer catalyst of the formula III remaining may be added during the reaction in portions or continuously, preferably continuously.

After the reaction conversion, the aqueous phase can be separated from the organic phase.

The carrier vapour for the carrier vapour distillation can be generated in situ or externally, preferably externally. The carrier used in the carrier vapour distillation may be nitrogen, steam, alcohols or a combination of the aforementioned substances.

The carrier vapour distillation may be a single-stage distillation, for example a still, or a multistage distillation, for example multiple stills or column(s) having trays or random packings or a packed column, preferably a packed column.

The carrier vapour distillation can be performed continuously or batchwise, preferably continuously.

The carrier vapour distillation can be performed under reduced pressure, preferably at a pressure of less than 100 mbar abs.

The reaction product can be separated from the aqueous phase by phase separation prior to the carrier vapour distillation. The reaction product can be separated prior to the carrier vapour distillation by filtration of solids, for example NaCl.

The reaction product can be purified by distillation prior to the carrier vapour distillation.

The top product from the carrier vapour distillation can be purified further for recovery of silicon-containing constituents. It is possible here to partly or completely remove degradation products of the phase transfer catalyst of the formula III from the silicon-containing constituents of the top product.

The removal of the degradation products of the phase transfer catalyst of the formula III from the top product of the carrier vapour distillation can be performed by treatment with ozone and/or distillation in any sequence.

If degradation products of the phase transfer catalyst of the formula III are removed from the top product of the carrier vapour distillation by performing a distillation, the distillation used may be a further carrier vapour distillation.

A distillation for purification of the top product may be executed as a separate distillation or as an integral part of the carrier vapour distillation.

A distillative purification of the top product may be performed before or after condensation thereof. A distillative purification of the top product may be performed after a phase separation that follows the condensation.

The top product that has been partly or completely freed of the degradation products of the phase transfer catalyst of the formula III may be used either outside the process or in any desired step prior to the carrier vapour distillation.

For the ozone treatment, it is possible to use pure ozone, or ozone diluted in other gases, for example air, oxygen or nitrogen, preferably air.

The ozone treatment can be performed continuously or batchwise, preferably continuously.

The ozone can be produced by means of an ozone generator.

The reaction product can be separated from the aqueous phase by phase separation prior to the ozone treatment. The reaction product can be separated prior to the ozone treatment by filtration of solids, for example NaCl.

The reaction product can be purified by distillation prior to the ozone treatment.

Volatile degradation products from the ozonization can be removed from the product by distillation.

For distillative removal of the volatile degradation products from the ozonization, it is possible to use continuous and batchwise distillation processes. Thin-film evaporators in particular may be used for continuous distillation processes.

By the process steps of carrier vapour distillation and/or ozone treatment, it is possible to separate off or degrade the degradation products formed in the PTC process from the phase transfer catalyst of the formula III, for example arsines, phosphines or amines, preferably tributylamine.

In addition, it is possible to perform a charcoal aftertreatment. Activated charcoal may be used for the charcoal aftertreatment. The charcoal aftertreatment may be performed after the carrier vapour distillation and/or after the ozone treatment.

The charcoal aftertreatment may be effected by adding charcoal to the polysulfane silanes of the formula I and then filtering, or by passing polysulfane silanes of the formula I through a charcoal-containing fixed bed.

Further aftertreatments for removal of the degradation products of the phase transfer catalyst of the formula III, for example tributylamine, may be performed with iodine, chlorosilanes, peroxides or methyl iodide.

The invention further provides for the use of a carrier vapour distillation and/or ozone treatment for removal of degradation products of a phase transfer catalyst.

The use of a carrier vapour distillation and/or ozone treatment for removal of degradation products of a phase transfer catalyst, preferably a phase transfer catalyst of the formula III, may be used in the preparation of sulfur-containing organosilanes, preferably polysulfane silanes, thiocyanatosilanes, and blocked and unblocked mercaptosilanes.

The carrier vapour distillation and/or ozone treatment may be followed downstream by an activated charcoal treatment.

The advantage of the process according to the invention is the removal of degradation products, some of them toxic or harmful to health, of the phase transfer catalyst of the formula III in the end product, associated with an improvement in storage stability (colour and S distribution).

Analytical gas chromatography (GC) of reaction mixtures and pure substances was performed with an Agilent 7820A gas chromatograph according to ASTM D 6843-02:

Analytical separations of the sulfur compounds and the determination of the sulfur chain length were performed using an analytical HPLC Series 1260 Infinity II system from Agilent Technologies according to ASTM D 6844-02.

Column: Bakerbond C18 (RP), 5 μm, 4.6×250 mm, flow rate 1.50 ml/min, A=254 nm, column temperature 30° C., mobile phase: mixture of 200 ml of tetrabutylammonium bromide solution (prepared from 400 mg of tetrabutylammonium bromide in 1 l of demineralized water), 450 ml of ethanol and 1350 ml of methanol. The average sulfur chain length and the S2 to S10 sample constituents were determined in an analysis and evaluation described in ASTM D 6844.

EXAMPLES

Comparative Example 1: Preparation of bis(triethoxysilylpropyl)disulfane

For preparation of bis(triethoxysilylpropyl)disulfane by means of phase transfer catalysis, a mixture of sodium carbonate (189 g, 1.8 mol, 1.2 equiv.), sodium hydrogen-sulfide (225 g, 1.6 mol, 1.0 equiv., 40.0% aqueous solution) and water (572 g, 32 mol, 21 equiv.) was heated to 72° C. The reaction mixture was first stirred at 72° C. for 10 min, then sulfur (55 g, 1.7 mol, 1.1 equiv.) was added to the mixture, which was stirred at 72° C. for a further 45 minutes. Tetra-n-butylammonium bromide (20 g, 0.03 mol, 0.02 equiv., 50% aqueous solution) and (3-chloropropyl)triethoxysilane (743 g, 3.1 mol, 2.0 equiv.) were added successively to the reaction mixture at 70-80° C. The suspension was stirred at 75° C. for 3 hours (GC conversion after 1 hour=98%). After the reaction had ended, water (589 g) was added and the phases were separated at 71° C. The crude product (793 g) was obtained as a yellow liquid. Low boilers were then removed by means of a thin-film evaporator at 140° C. and 10 mbar abs., such that the bis(triethoxysilyl-propyl)disulfane was isolated as bottom product and then filtered.

Comparative Example 2: Preparation of bis(triethoxysilylpropyl)tetrasulfane

For preparation of bis(triethoxysilylpropyl)tetrasulfane by means of phase transfer catalysis, a mixture of sodium hydroxide (81 g, 1.0 mol, 1.0 equiv.), sodium hydrogensulfide (284 g, 2.0 mol, 2.0 equiv., 40.0% aqueous solution) and water (158 g, 8.8 mol, 4.2 equiv.) was heated to 70° C. The reaction mixture was first stirred at 70° C. for 10 min, then sulfur (184 g, 5.7 mol, 2.8 equiv.) was added to the mixture, which was stirred at 72° C. for a further 15 minutes. Tetra-n-butylammonium bromide (17 g, 0.03 mol, 0.01 equiv., 50% aqueous solution) and (3-chloropropyl)triethoxysilane (999 g, 4.2 mol, 2.0 equiv.) were added successively to the reaction mixture at 70-80° C. The suspension was stirred at 75° C. for 2 hours (GC conversion after 2 hours=98%). After the reaction had ended, water (249 g) was added and the phases were separated at 71° C. The crude product (1.1 kg) was obtained as a yellow liquid. Low boilers were then removed by means of a thin-film evaporator at 140° C. and 10 mbar abs., such that the bis (triethoxysilylpropyl)tetrasulfane was isolated as bottom product and then filtered.

Example 1: Carrier Vapour Distillation of bis(triethoxysilylpropyl)disulfane The bis(triethoxysilylpropyl)disulfane from Comparative Example 1 was preheated to 97° C. and applied at 30 ml/min at the top of a column that had been heated to 160° C. and evacuated to 20 mbar abs. Steam and nitrogen were fed in from the lower portion of the column in countercurrent, and were distilled off by means of a distillation system in the upper portion of the column. The distillate was enriched in tributylamine, and the bis(triethoxysilylpropyl)disulfane was isolated as a purified bottom product.

Column details: fill height 75 cm and internal diameter=25 mm, filled with porcelain saddles (diameter 6 mm)

GC before distillation: 0.54% tributylamine (degradation product of the PTC catalyst)

GC after distillation: 0.01% tributylamine

Example 2: Carrier Vapour Distillation of bis(triethoxysilylpropyl)tetrasulfane The bis(triethoxysilylpropyl)tetrasulfane from Comparative Example 2 was preheated to 97° C. and applied at 30 ml/min at the top of a column that had been heated to 160° C. and evacuated to 20 mbar abs. Steam and nitrogen were fed in from the lower portion of the column in countercurrent, and were distilled off by means of a distillation system in the upper portion of the column. The distillate was enriched in tributylamine, and the bis(triethoxysilylpropyl) tetrasulfane was isolated as a purified bottom product.

Column details: fill height 75 cm and internal diameter=25 mm, filled with porcelain saddles (diameter 6 mm)

GC before distillation: 0.33% tributylamine (degradation product of the PTC catalyst)

GC after distillation: <0.01% tributylamine

Example 3: Carrier Vapour Distillation of bis(triethoxysilylpropyl)disulfane Multiple batches of bis(triethoxysilylpropyl)disulfane that had been prepared according to Comparative Example 1 were preheated to 120° C. and applied from the top at 20 kg/h to a column that had been heated to 120° C. and evacuated to 35 mbar abs. Steam (4 kg/h) and nitrogen (1 NL/min) were fed in from the lower portion of the column in countercurrent, and were distilled off by means of a distillation system in the upper portion of the column. The distillate was enriched in tributylamine, and the bis(triethoxysilylpropyD)disulfane was isolated as a purified bottom product.

Column details: DN80 rectification column: 4×1 m glass column sections with compensation heating, packed with a Montz A3-500 fabric packing, were used.

GC before distillation: 0.56% tributylamine (degradation product of the PTC catalyst)

GC after distillation: <0.01% tributylamine

Example 4: Carrier Vapour Distillation of bis(triethoxysilylpropyl)tetrasulfane Multiple batches of bis(triethoxysilylpropyl)tetrasulfane that had been prepared according to Comparative Example 2 were preheated to 140° C. and applied from the top at 25 kg/h to a column that had been heated to 140° C. and evacuated to 35 mbar abs. Steam (3 kg/h) and nitrogen (0.5 NL/min) were fed in from the lower portion of the colunm in countercurrent, and were distilled off by means of a distillation system in the upper portion of the column. The distillate was enriched in tributylamine, and the bis(triethoxysilylpropyl)tetrasulfane was isolated as a purified bottom product.

Column details: DN80 rectification column: 4×1 m glass column sections with compensation heating, packed with a Montz A3-500 fabric packing.

GC before distillation: 0.38% tributylamine (degradation product of the PTC catalyst)

GC after distillation: <0.01% tributylamine

Example 5: Ozone Treatment of bis(triethoxysilylpropyl)disulfane

A bottle-shaped 250 ml reaction apparatus was charged with 150 g of bis(triethoxysilylpropyl)disulfane from Comparative Example 1, which was stirred at room temperature. By means of a hose, over a period of 2 hours, an ozone/air mixture produced in an ozone generator with an ozone constituent of about 260 mg of ozone was passed through the crude product. Low boilers were then removed by means of a thin-film evaporator at 140° C. and 13 mbar abs., such that the bis(triethoxysilylpropyl)disulfane was isolated as bottom product.

Output of the ozone generator: about 130 mg/h in air

GC before ozone treatment: 0.1% ethanol, 0.16% tributylamine (degradation product of the PTC catalyst)

GC after ozone treatment: 0.1% ethanol, <0.01% tributylamine

GC after thin-film evaporator 0.02% ethanol, <0.01% tributylamine

Example 6: Ozone Treatment of bis(triethoxysilylpropyl)tetrasulfane

A bottle-shaped 250 ml reaction apparatus was charged with 150 g of bis(triethoxysilylpropyl)tetrasulfane from Comparative Example 2, which was stirred at room temperature. By means of a hose, over a period of 1 h, an ozone/air mixture produced in an ozone generator with an ozone constituent of about 130 mg of ozone was passed through the crude product.

Low boilers were then removed by means of a thin-film evaporator at 140° C. and 13 mbar abs., such that the bis(triethoxysilylpropyl)tetrasulfane was isolated as bottom product.

Output of the ozone generator: about 130 mg/h in air

GC before ozone treatment: 0.2% ethanol, 0.15% tributylamine (degradation product of the PTC catalyst)

GC after ozone treatment: 0.04% ethanol, <0.01% tributylamine

GC after thin-film evaporator 0.03% ethanol, <0.01% tributylamine

Example 7: Activated Charcoal Treatment of bis(triethoxysilylpropyl)disulfane Bis(triethoxysilylpropyl)disulfane was treated by means of the process according to the invention by carrier vapour distillation according to Example 1. In the subsequent step, the bis(triethoxysilylpropyl)disulfane from Example 1 was admixed in each case with 1% or 2% activated charcoal at room temperature and then filtered.

GC before activated charcoal: 0.01% tributylamine

GC after 1% activated charcoal: <0.01% tributylamine

GC after 2% activated charcoal: <0.01% tributylamine

Example 8: Activated Charcoal Treatment of bis(triethoxysilylpropyl)tetrasulfane Bis(triethoxysilylpropyl)tetrasulfane was treated by means of distillation according to the invention by carrier vapour distillation according to Example 2. In the subsequent step, the bis(triethoxysilylpropyl)tetrasulfane from Example 2 was admixed in each case with 1% or 2% activated charcoal at room temperature and then filtered.

GC before activated charcoal: 0.01% tributylamine

GC after 1% activated charcoal: <0.01% tributylamine

GC after 2% activated charcoal: <0.01% tributylamine

Example 9: Stability Tests on bis(triethoxysilylpropyl)tetrasulfane with 0.28% tributylamine Comparative Example 2 was subjected to a prolonged storage stability test. The bis(triethoxysilylpropyl)tetrasulfane was analysed by HPLC at defined time intervals. S2 and S3 content after the production are unstable.

HPLC after about 1 day: S2 content: 17% by wt., S3 content: 31% by wt., $S_4$-$S_{10}$ content: 52% by wt.

HPLC after about 7 months: S2 content: 16% by wt., S3 content: 32% by wt., $S_4$-$S_{10}$ content: 52% by wt.

HPLC after about 15 months: S2 content: 15% by wt., S3 content: 33% by wt., $S_4$-$S_{10}$ content: 52% by wt.

Example 10: Stability Tests on bis(triethoxysilylpropyl)tetrasulfane with <0.01% tributylamine Inventive Example 2 was subjected to a prolonged storage stability test. The bis(triethoxysilylpropyl)tetrasulfane was analysed by HPLC at defined time intervals. S2 and S3 content after the production are stable.

HPLC after about 1 day: S2 content: 18% by wt, S3 content: 31% by wt, $S_4$-$S_{10}$ content: 51% by wt.

HPLC after about 1 month: S2 content: 18% by wt, S3 content: 31% by wt, $S_4$-$S_{10}$ content: 51% by wt.

HPLC after about 6 months: S2 content: 18% by wt, S3 content: 31% by wt, $S_4$-$S_{10}$ content: 51% by wt.

Example 11: Stability Tests on bis(triethoxysilylpropyl)tetrasulfane with <0.01% tributylamine Inventive Example 5 was subjected to a prolonged storage stability test. The bis(triethoxysilylpropyl)tetrasulfane was analysed by HPLC at defined time intervals. S2 and S3 content after the production are stable.

HPLC after about 1 day: S2 content: 17% by wt., S3 content: 31% by wt., $S_4$-$S_{10}$ content: 52% by wt.

HPLC after about 5 months: S2 content: 17% by wt., S3 content: 31% by wt., $S_4$-$S_{10}$ content: 52% by wt.

HPLC after about 23 months: S2 content: 17% by wt., S3 content: 31% by wt., $S_4$-$S_{10}$ content: 52% by wt.

The invention claimed is:

1. A process for preparing polysulfane silanes of the formula I $$(R^1)_{3-m}R^2{}_mSi\text{—}R^3\text{—}S_x\text{—}R^3\text{—}SiR^2{}_m(R^1)_{3-m} \qquad I$$

where $R^1$ are the same or different and are a C1-C10-alkoxy group, phenoxy group, or alkyl polyether group —$(R'$—$O)_rR''$ where R' is the same or different and is a branched or unbranched, saturated or unsaturated, aliphatic, aromatic, or mixed aliphatic/aromatic divalent C1-C30 hydrocarbon group, r is an integer from 1 to 30 and R'' is unsubstituted or substituted, branched or unbranched, monovalent alkyl, alkenyl, aryl, or aralkyl group, $R^2$ are the same or different and are C6-C20 aryl groups, C1-C10 alkyl groups, C2-C20 alkenyl groups, C7-C20 aralkyl groups, or halogen, $R^3$ are the same or different and are a branched or unbranched, saturated or unsaturated, aliphatic, aromatic, or mixed aliphatic/aromatic divalent C1-C30 hydrocarbon group, and m is the same or different and is 0, 1, 2, or 3, x is 2-10, by reacting at least one silane of the formula II $$(R^1)_{3-m}R^2{}_mSi\text{—}R^3\text{-Hal} \qquad II$$

where Hal is Cl, Br, or I with $M(SH)_y$ and/or $M_zS$ and/or $M_gS_h$ and/or sulfur, where in the formula $M(SH)_y$, y is 1 or 2, and M is Na or K when y is 1, and M is Ca or Mg when y is 2, and in the formula $M_zS$, z is 1 or 2, and M is Ca or Mg when z is 1, and M is Na or K when z is 2, and in the formula $M_gS_h$, g is 1 or 2, and M is Ca or Mg when g is 1, and M is Na or K when g is 2, h is a natural number from 1 to 10, in the presence of a base, an aqueous phase and a phase transfer catalyst of the formula III $$\overset{\oplus}{\underset{R^4}{\phantom{x}}}\overset{R^5}{\underset{}{\overset{|}{Y}}}\overset{R^6}{\underset{R^7}{\phantom{x}}} \quad X^\ominus \qquad \text{III}$$

where Y is an element of main group 5, $R^4$, $R^5$, $R^6$, and $R^7$ are identical or different and are —$(CH_2)_k$ $CH_3$ alkyl radicals, with k=0-9, or wherein any of two substituents selected from the $R^4$, $R^5$, $R^6$, and $R^7$ groups can form a ring with one or two ring closures —$(CH_2)_n$— with n=2-5, between two substituents selected from the $R^4$, $R^5$, $R^6$, and $R^7$ groups, and $X^-$ is $F^-$, $I^-$, $Cl^-$, $Br^-$, $ClO4^-$, $PF_6^-$, $BF_4^-$, $(C_6H_5)_4B^-$, $H_2PO_4^-$, $CH_3SO_3^-$, $C_6H_5SO_3^-$, $HSO_4^-$, $NO_3^-$, or ½ $SO_4^{2-}$, wherein at least one carrier vapour distillation and/or ozone treatment is performed during or after the reaction, wherein the vapour distillation and/or ozone treatment removes degradation products of the phase transfer catalyst which are arsine, phosphine, or amines, and wherein the base is $Na_2CO_3$ or NaOH, wherein the carrier for the at least one carrier vapor distillation comprises a stream of steam and nitrogen, wherein the process comprises the ozone treatment, and wherein the ozone treatment comprises treatment with pure ozone or ozone produced in an ozone generator.

2. The process for preparing polysulfane silanes of the formula I according to claim 1, wherein $R^1$ is ethoxy, m=0, and $R^3$=$(CH_2)_3$.

3. The process for preparing polysulfane silanes of the formula I according to claim 1, wherein Hal=Cl.

4. The process for preparing polysulfane silanes of the formula I according to claim 1, wherein M=Na.

5. The process for preparing polysulfane silanes of the formula I according to claim 1, wherein the reaction is conducted at temperatures from 25° C. to 200° C.

6. The process for preparing polysulfane silanes of the formula I according to claim 1, wherein the phase transfer catalyst of the formula III and the silane of the formula II are added to the aqueous phase.

7. The process for preparing polysulfane silanes of the formula I according to claim 1, wherein a charcoal after-treatment is additionally conducted.

8. The process for preparing polysulfane silanes of the formula I according to claim 1, wherein $M(SH)_y$ and/or $M_zS$ and/or $M_gS_h$ are prepared from MOH and sulfur in situ.

9. The process for preparing polysulfane silanes of the formula I according to claim 1, wherein there are said one or two ring closures —$(CH_2)_n$—, with n=4.

10. The process for preparing polysulfane silanes of the formula I according to claim 1, wherein the vapour distillation and/or ozone treatment removes a degradation product comprising tributylamine.

11. The process for preparing polysulfane silanes of the formula I according to claim 1, comprising the vapour distillation.

12. The process for preparing polysulfane silanes of the formula I according to claim 1, wherein Y is nitrogen.

13. The process for preparing polysulfane silanes of the formula I according to claim 1, wherein $R^1$ is ethoxy.

14. The process for preparing polysulfane silanes of the formula I according to claim 1, wherein the process is performed without any organic solvent.

15. The process for preparing polysulfane silanes of the formula I according to claim 14, wherein the vapour distillation removes tributylamine.

16. The process for preparing polysulfane silanes of the formula I according to claim 1, wherein the ozone treatment removes tributylamine.

17. The process for preparing polysulfane silanes of the formula I according to claim 1, wherein the vapour distillation and/or ozone treatment is performed during the reaction.

18. The process for preparing polysulfane silanes of the formula I according to claim 1, wherein the vapour distillation and/or ozone treatment is performed after the reaction.

19. The process for preparing polysulfane silanes of the formula I according to claim 1, wherein the phase transfer catalyst is tetra-n-butylammonium bromide and the degradation product is tributylamine.

* * * * *